US012707234B2

(12) United States Patent
Shrivastava et al.

(10) Patent No.: US 12,707,234 B2
(45) **Date of Patent: *Aug. 11, 2026**

(54) METHOD AND APPARATUS FOR NEW RADIO MULTICAST BROADCAST SERVICE RECEPTION

(71) Applicant: Samsung Electronics Co., Ltd., Gyeonggi-do (KR)

(72) Inventors: Vinay Kumar Shrivastava, Bangalore (IN); Sangkyu Baek, Gyeonggi-do (KR); Himke Van Der Velde, Middlesex (GB)

(73) Assignee: Samsung Electronics Co., Ltd. (KR)

( * ) Notice: Subject to any disclaimer, the term of this patent is extended or adjusted under 35 U.S.C. 154(b) by 235 days.

This patent is subject to a terminal disclaimer.

(21) Appl. No.: 18/550,045

(22) PCT Filed: Mar. 11, 2022

(86) PCT No.: PCT/KR2022/003466

§ 371 (c)(1),
(2) Date: Sep. 11, 2023

(87) PCT Pub. No.: WO2022/191667

PCT Pub. Date: Sep. 15, 2022

(65) Prior Publication Data

US 2024/0187823 A1 Jun. 6, 2024

(30) Foreign Application Priority Data

Mar. 12, 2021 (IN) ............................ 202141010419
Feb. 23, 2022 (IN) ............................ 202141010419

(51) Int. Cl.

| | |
|---|---|
| ***H04W 4/06*** | (2009.01) |
| ***H04L 5/00*** | (2006.01) |
| ***H04W 76/28*** | (2018.01) |
| ***H04W 76/40*** | (2018.01) |

(52) U.S. Cl.
CPC ............ *H04W 4/06* (2013.01); *H04L 5/0053* (2013.01); *H04W 76/28* (2018.02); *H04W 76/40* (2018.02)

(58) Field of Classification Search
CPC ....... H04W 4/06; H04W 76/28; H04W 76/40; H04W 76/27; H04L 5/0053
See application file for complete search history.

(56) References Cited

U.S. PATENT DOCUMENTS

2015/0282208 A1 10/2015 Yi et al.
2017/0201964 A1 7/2017 Gupta et al.
(Continued)

OTHER PUBLICATIONS

European Search Report dated Jul. 15, 2024 issued in counterpart application No. 22767563.4-1215, 9 pages.
(Continued)

*Primary Examiner* — Sharmin Chowdhury
(74) *Attorney, Agent, or Firm* — The Farrell Law Firm, P.C.

(57) ABSTRACT

The disclosure relates to a 5G or 6G communication system for supporting a higher data transmission rate. Embodiments herein disclose methods and systems for efficient and reliable reception for New Radio Multicast Broadcast Service (NR MBS). Embodiments herein disclose a DRX approach and HARQ transmission and retransmission for MBS packets in order to support power efficient and reliable delivery of 5G MBS. Embodiments herein disclose mechanisms that work for the PTM and PTP based delivery framework for NR MBS.

8 Claims, 17 Drawing Sheets

(56) References Cited

U.S. PATENT DOCUMENTS

| | | | | |
|---|---|---|---|---|
| 2018/0375623 | A1 | 12/2018 | Suzuki et al. | |
| 2023/0063082 | A1* | 3/2023 | Zhou | H04L 1/1864 |
| 2023/0209465 | A1* | 6/2023 | Zhou | H04W 72/232 370/311 |
| 2023/0354153 | A1* | 11/2023 | Liu | H04L 45/16 |
| 2023/0363051 | A1* | 11/2023 | Liu | H04W 52/0248 |
| 2023/0388972 | A1* | 11/2023 | Chang | H04W 4/06 |
| 2024/0129785 | A1* | 4/2024 | Chai | H04W 76/15 |

OTHER PUBLICATIONS

PCT/ISA/210 Search Report dated Jun. 16, 2022, issued on PCT/KR2022/003466, pp. 3.

PCT/ISA/237 Written Opinion dated Jun. 16, 2022, issued on PCT/KR2022/003466, pp. 4.

Intel Corporation, "MBS MAC Layer and Group Scheduling Aspects", 3GPP TSG-RAN WG2 Meeting #113-e R2-2100361 Electronic meeting, Jan. 25-Feb. 5, 2021, pp. 7.

Vivo, "Group Scheduling for MBS", 3GPP TSG-RAN WG2 Meeting #113 electronic R2-2100836 E-Meeting, Jan. 25-Feb. 5, 2021, pp. 7.

Samsung, "Layer-2 Structure for MBS", 3GPP TSG RAN WG2 Meeting #112-e R2-2101006 e-Meeting, Jan. 25-Feb. 5, 2021, pp. 3.

Oppo, "Discussion on group-based scheduling for MBS", 3GPP TSG-RAN WG2 Meeting #112 electronic R2-2008874 Online, Nov. 2-13, 2020, pp. 8.

* cited by examiner

[Fig. 1A]
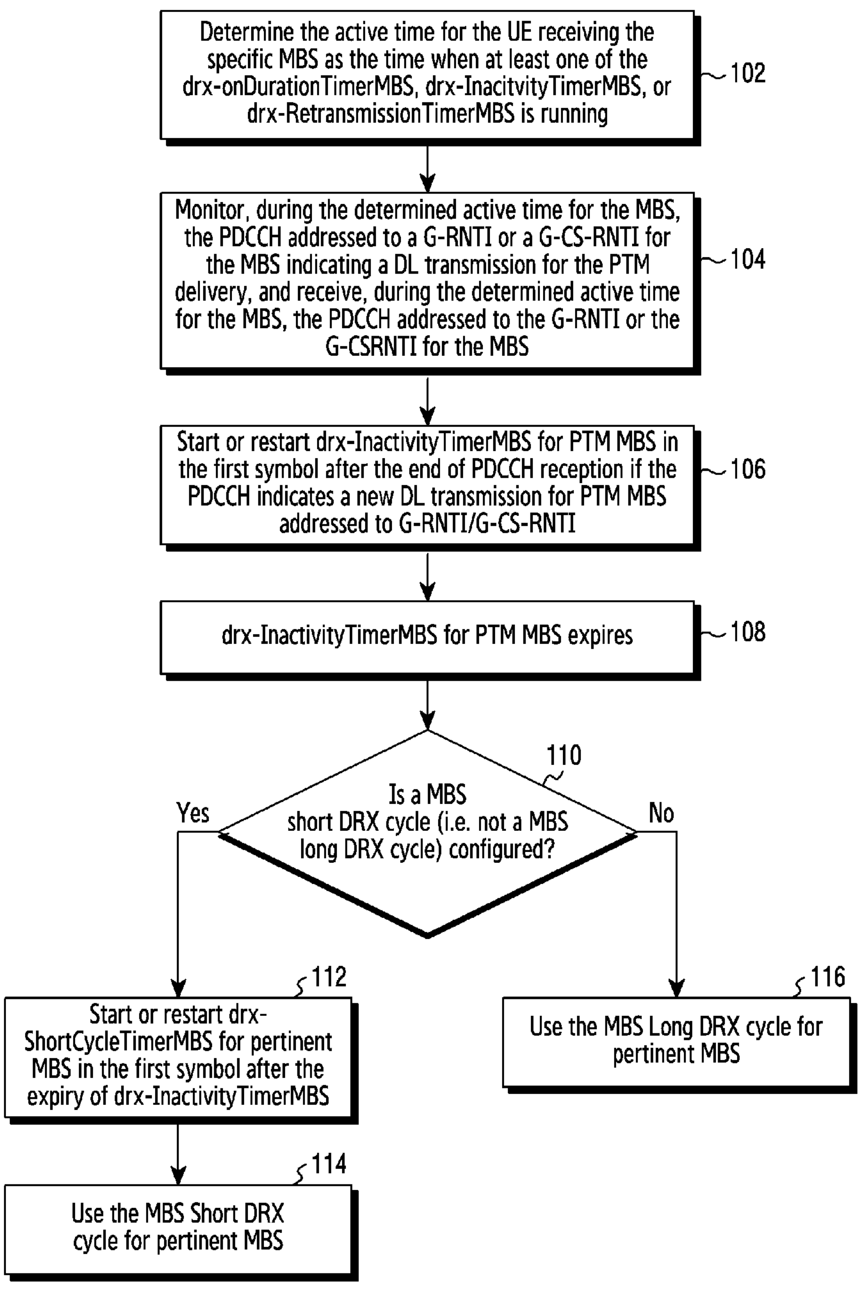

[Fig. 1B]

[Fig. 2A]
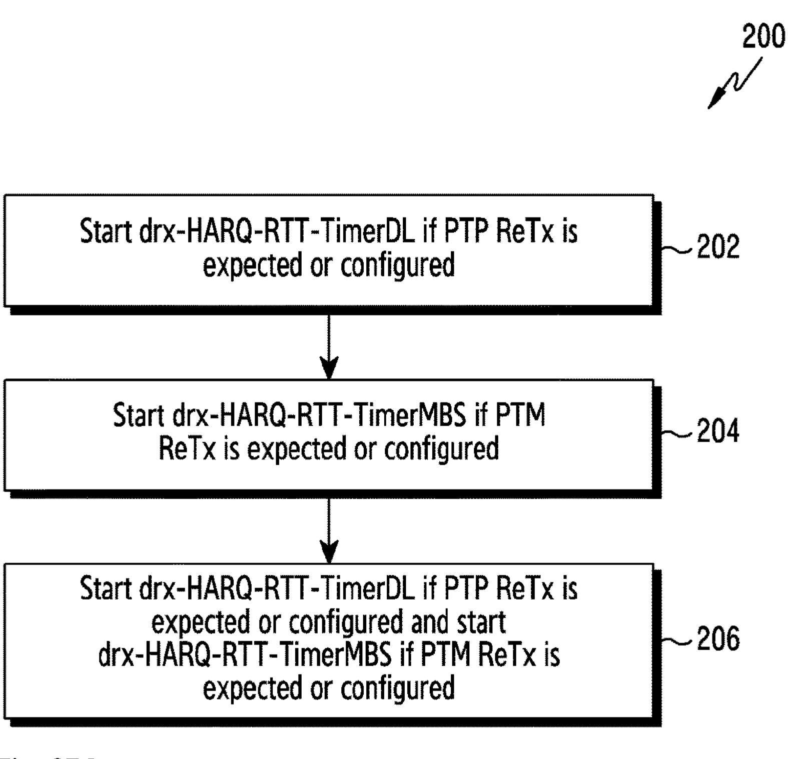
[Fig. 2B]
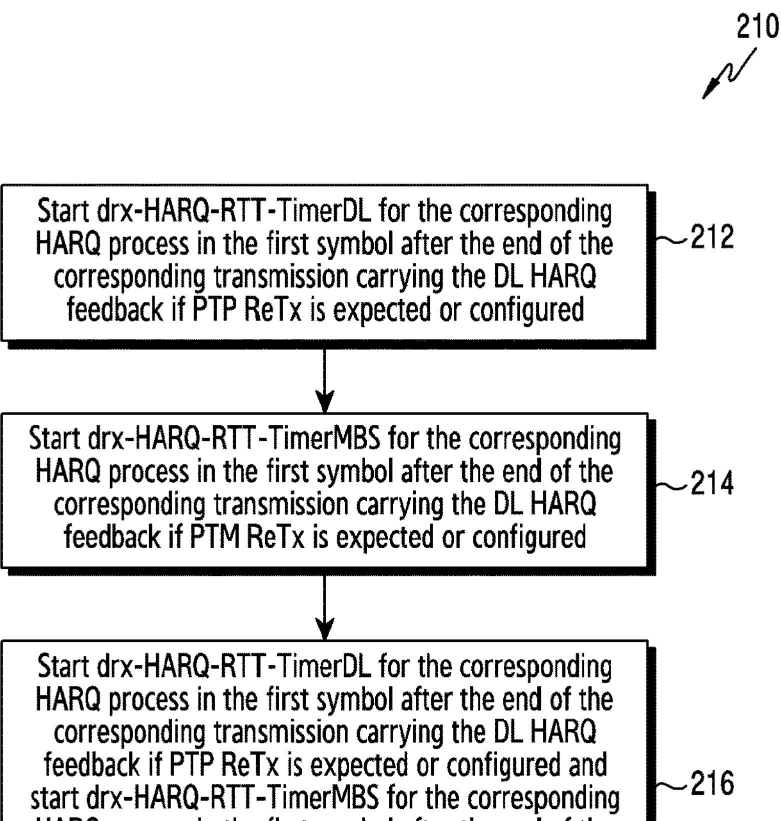

[Fig. 2C]
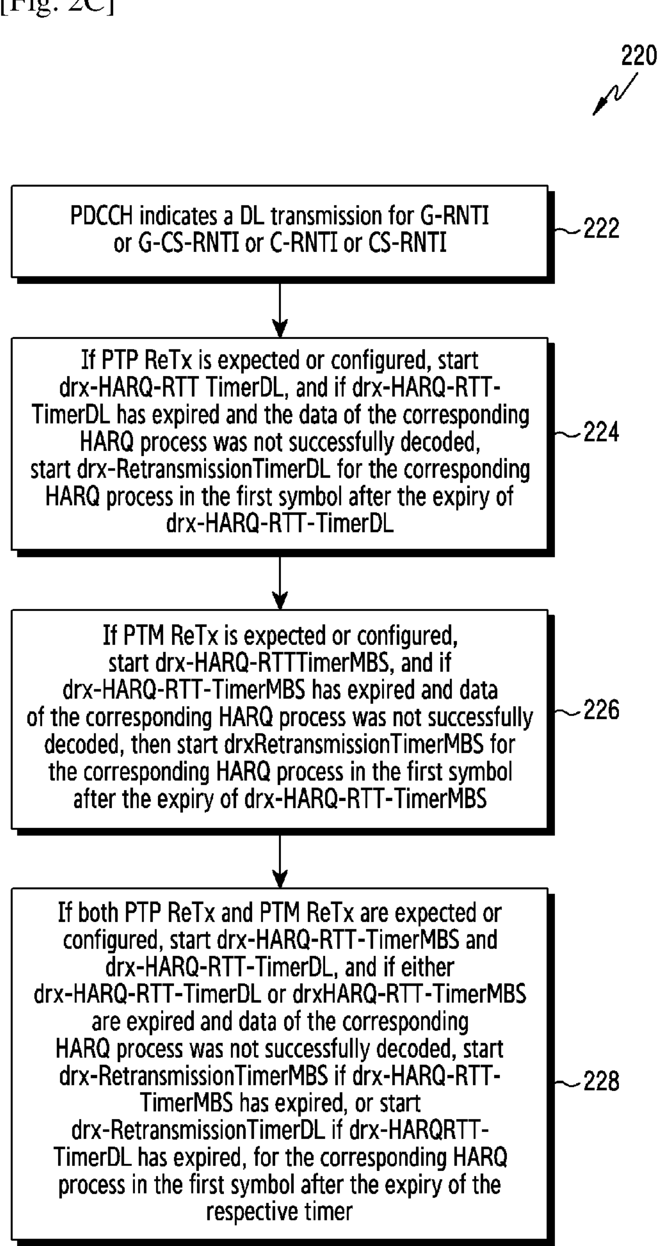

[Fig. 2D]
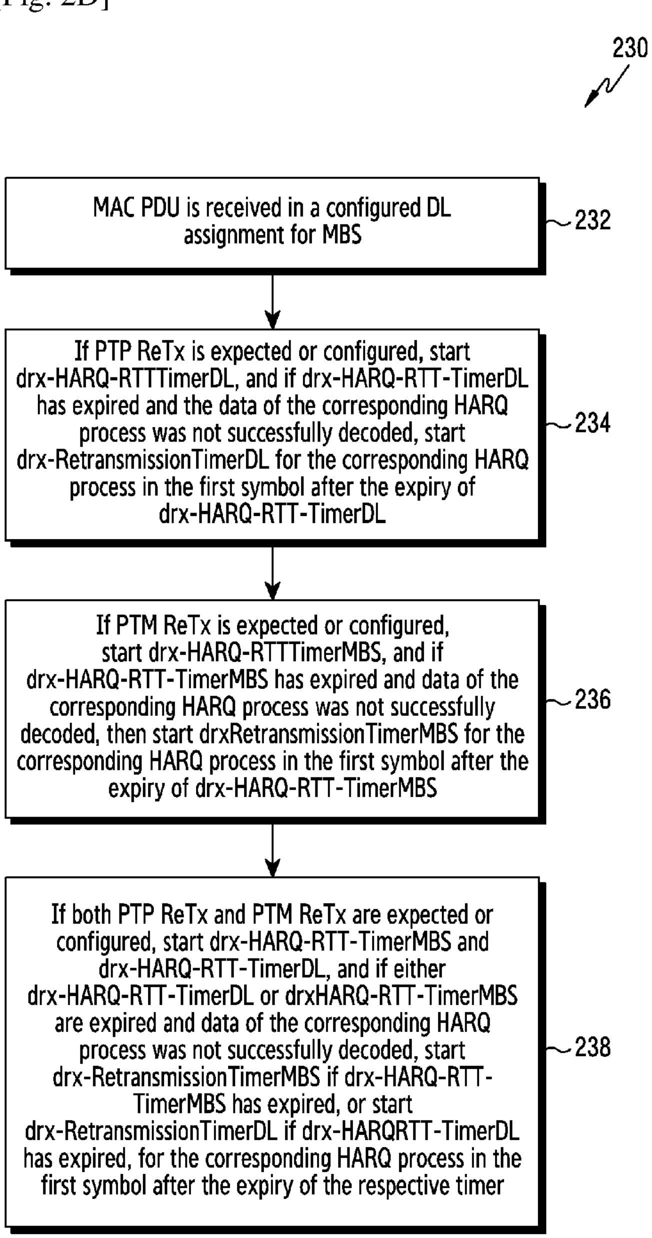

[Fig. 3A]
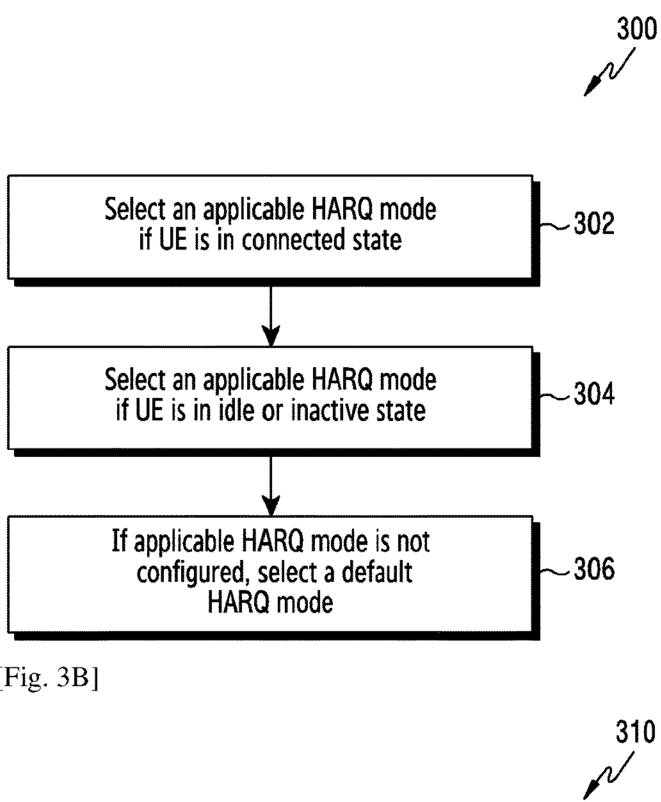
[Fig. 3B]
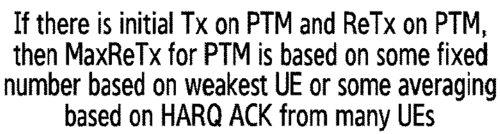

[Fig. 4]
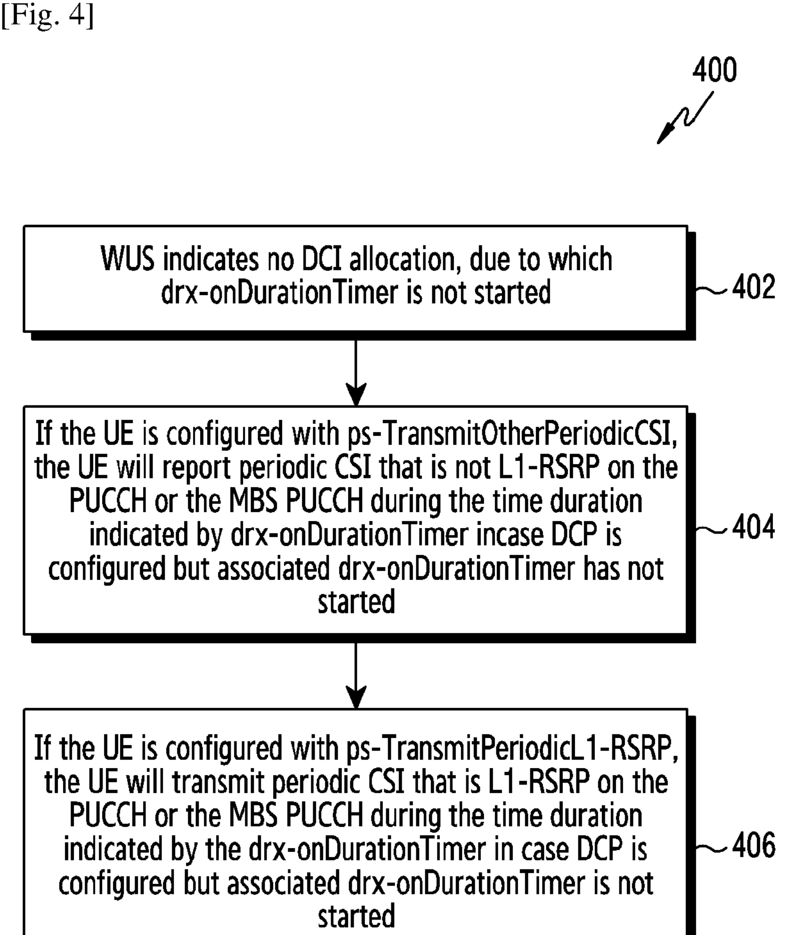

[Fig. 5]
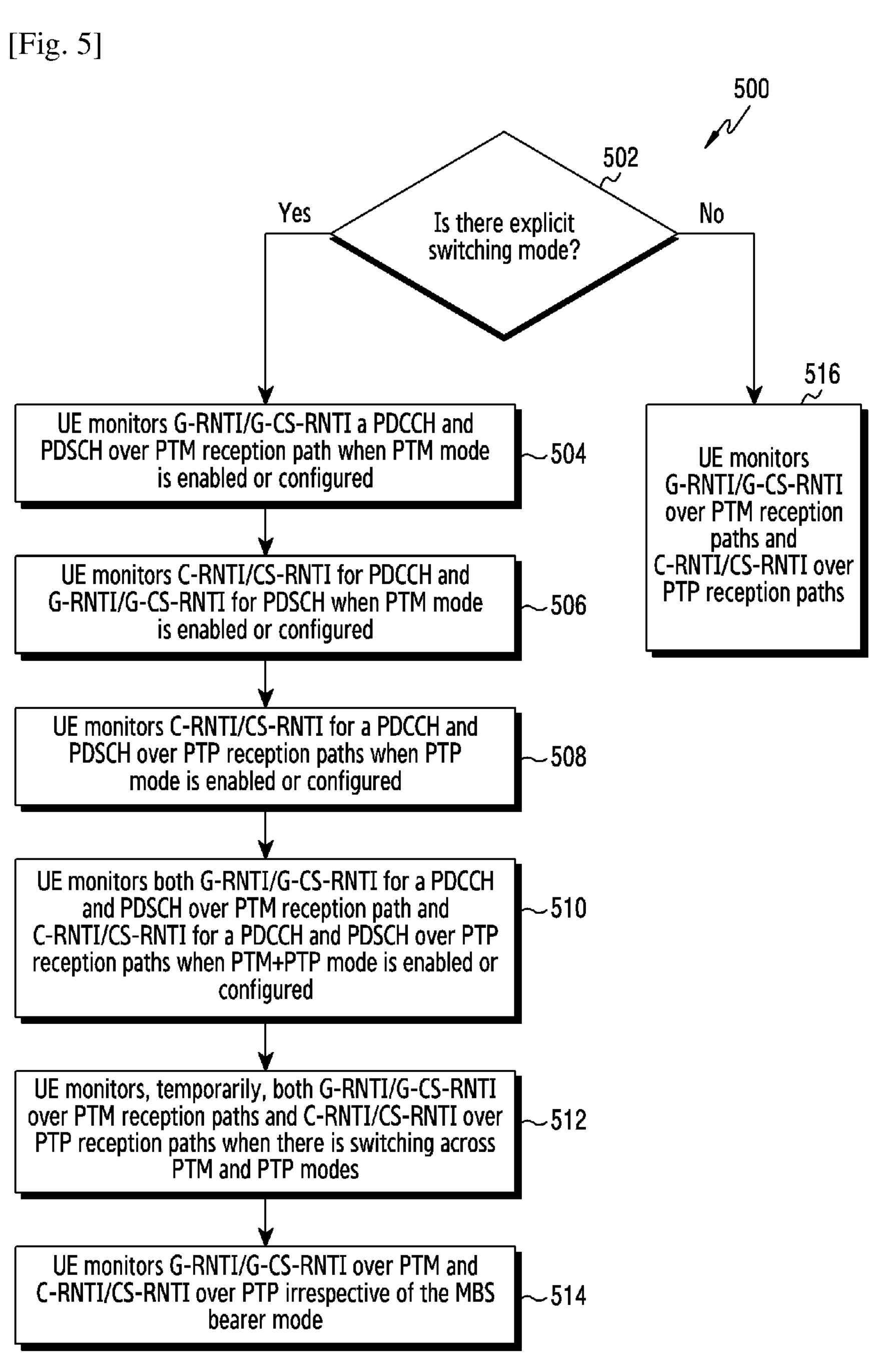

[Fig. 6]
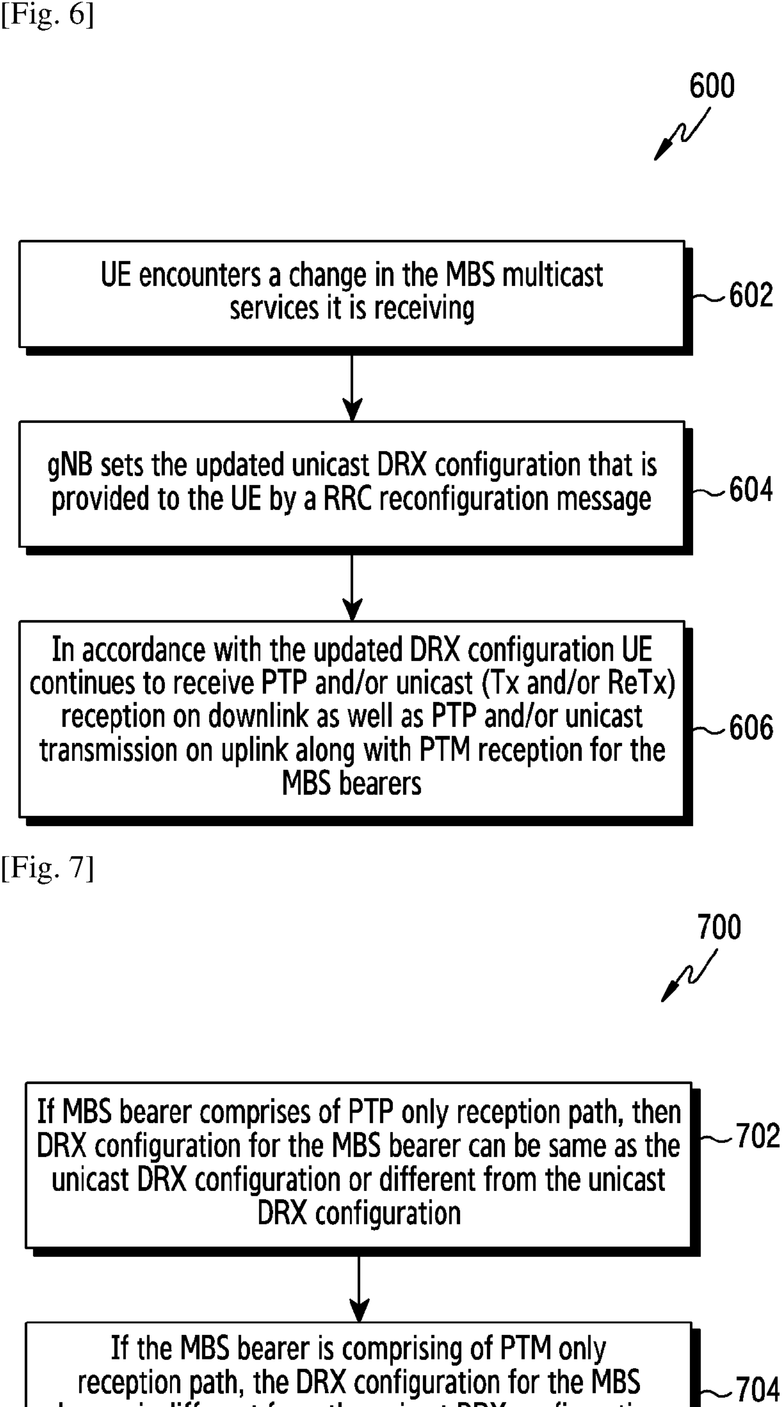

[Fig. 8]
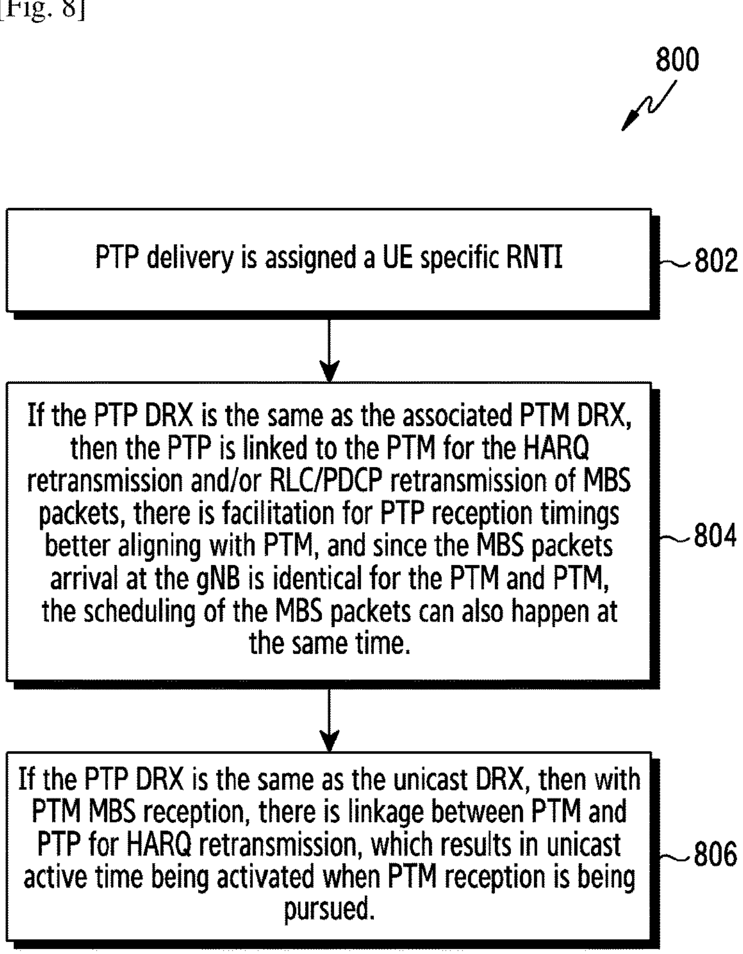
[Fig. 9]
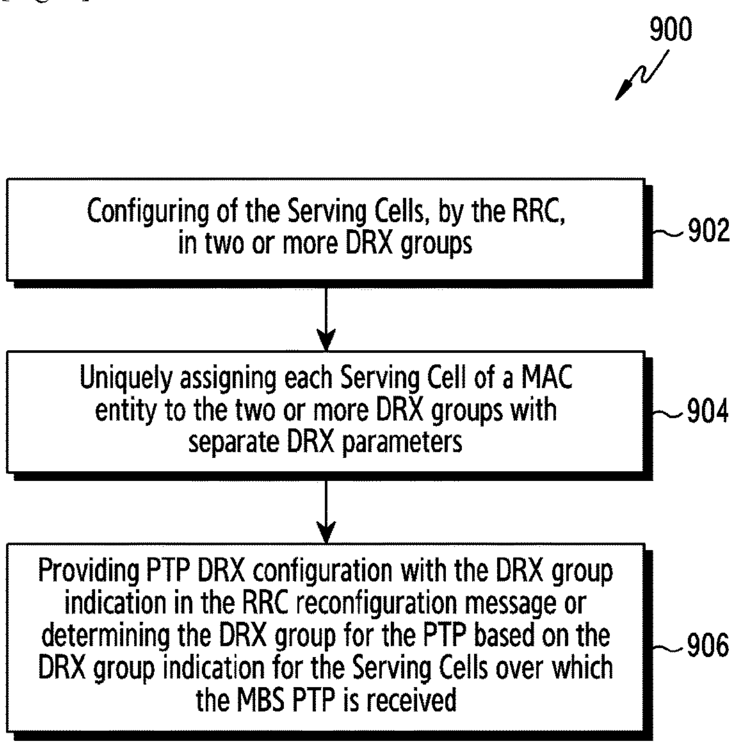

[Fig. 10A]
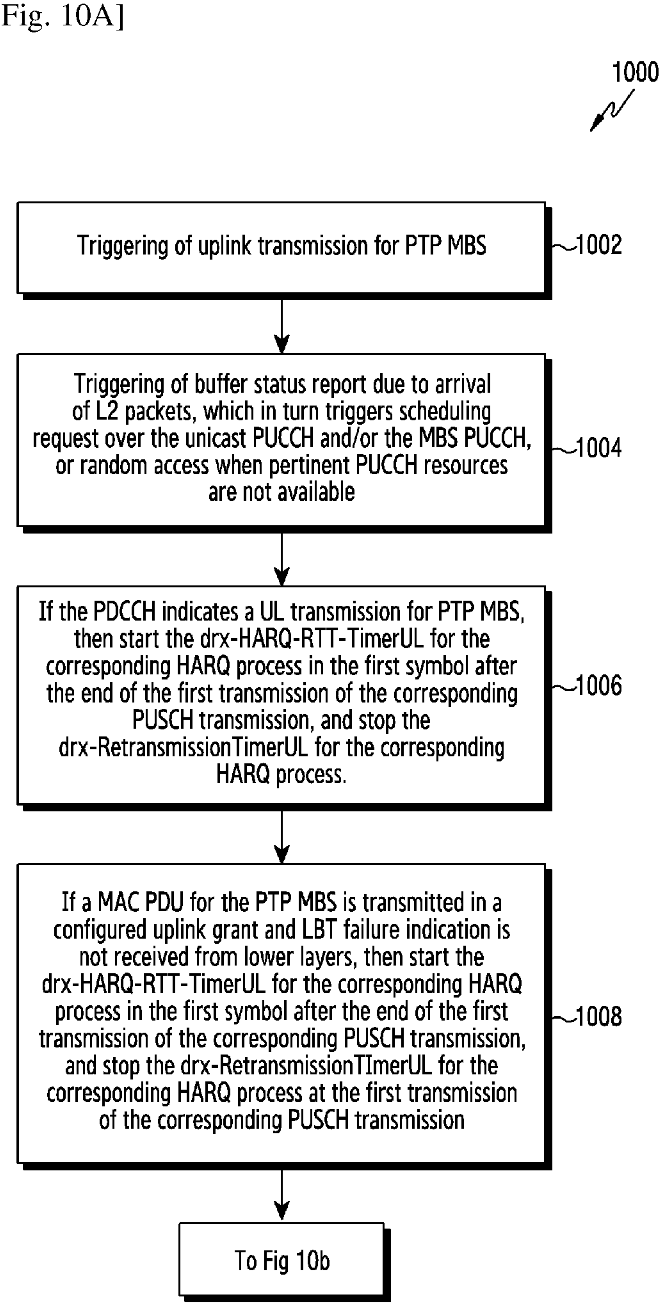

[Fig. 10B]
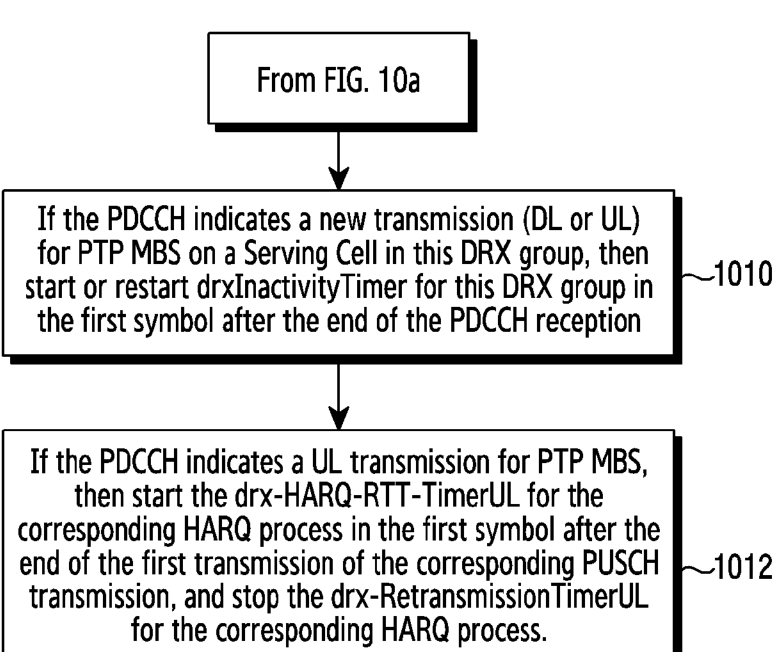

[Fig. 11A]
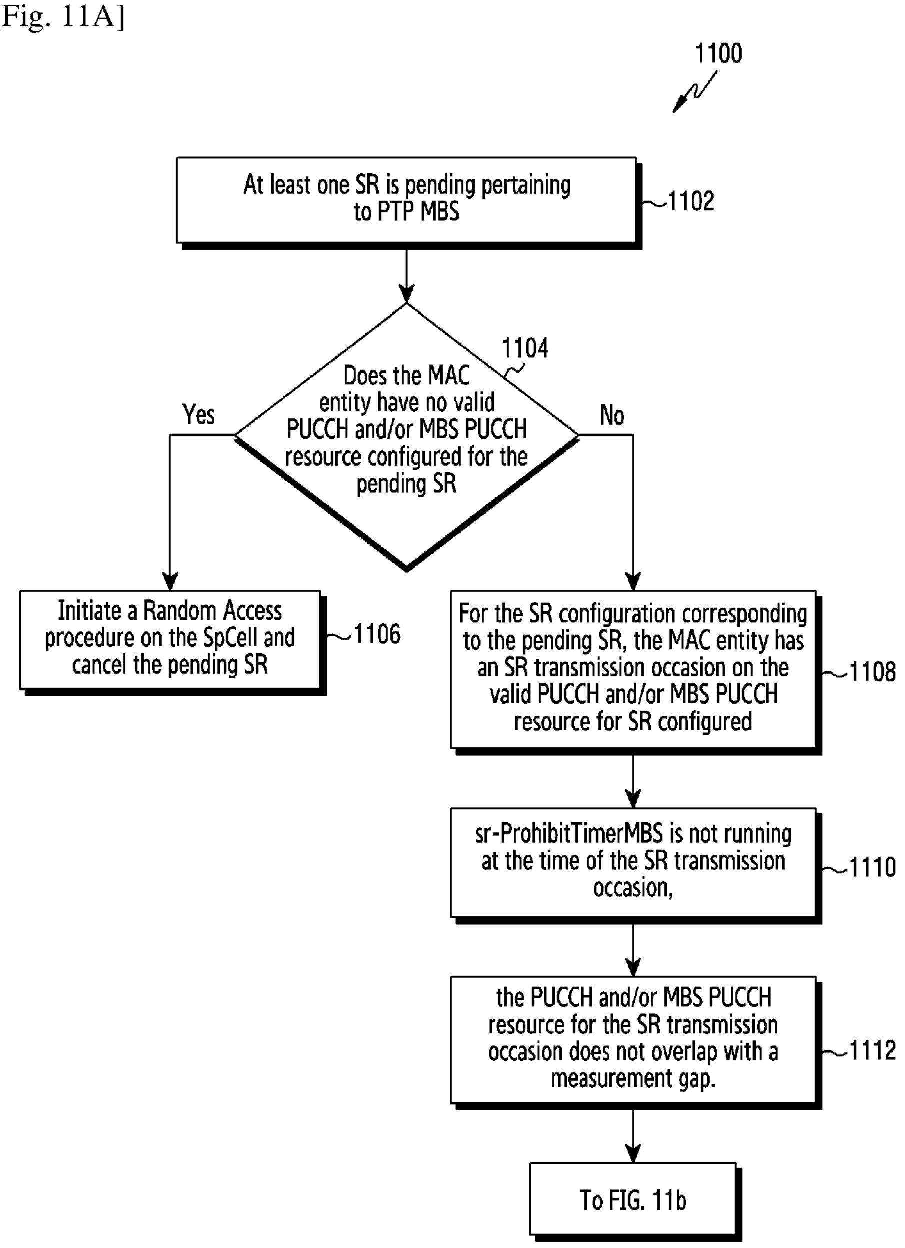

[Fig. 11B]
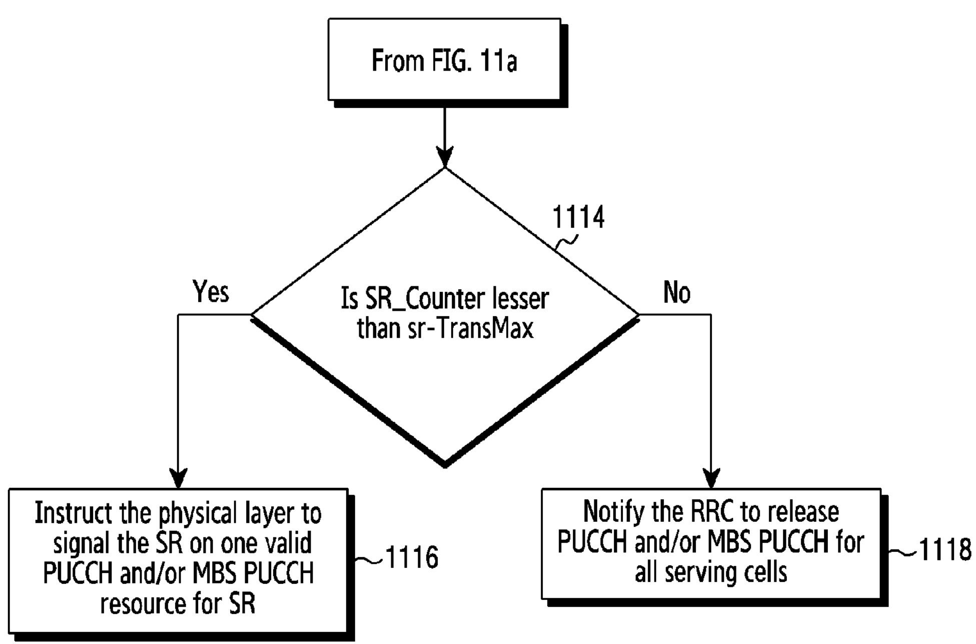
[Fig. 12]
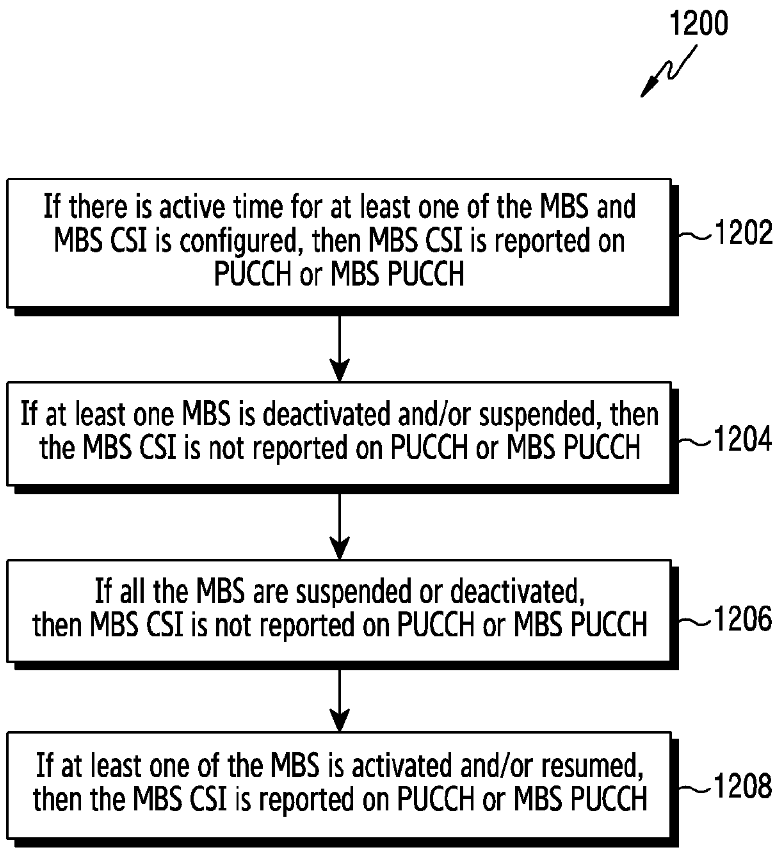

[Fig. 13]
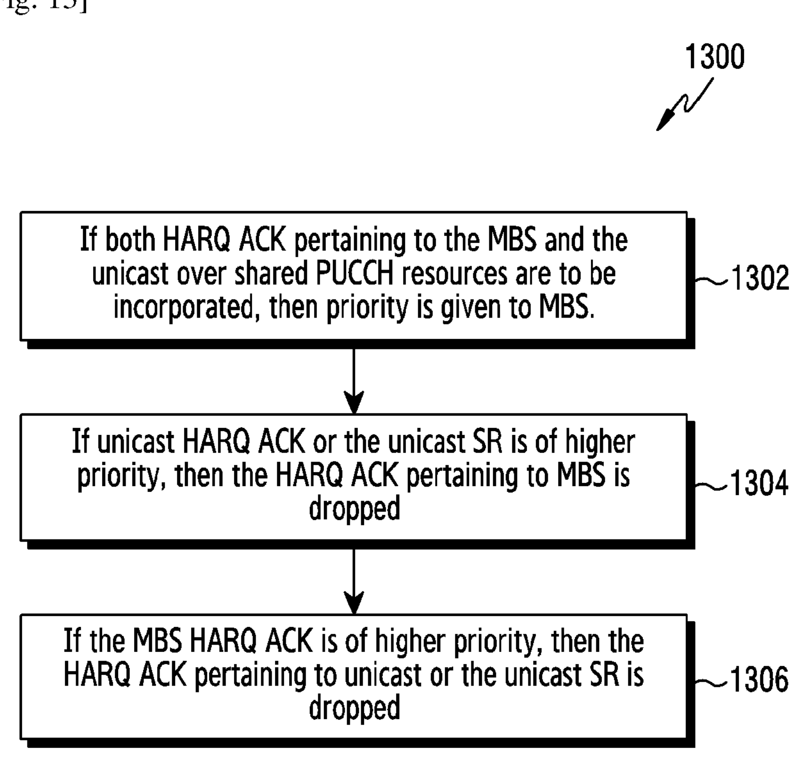
[Fig. 14]
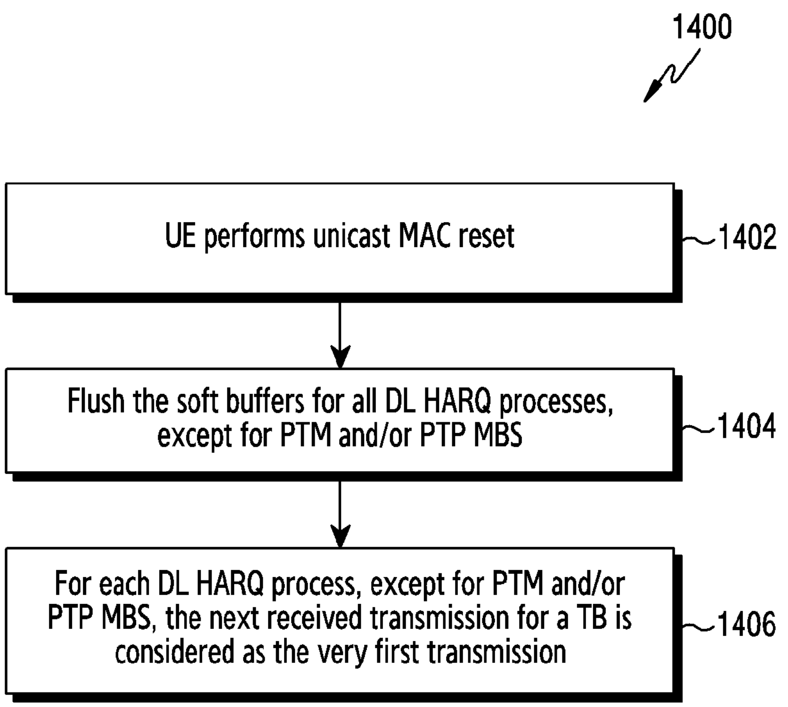

[Fig. 15]
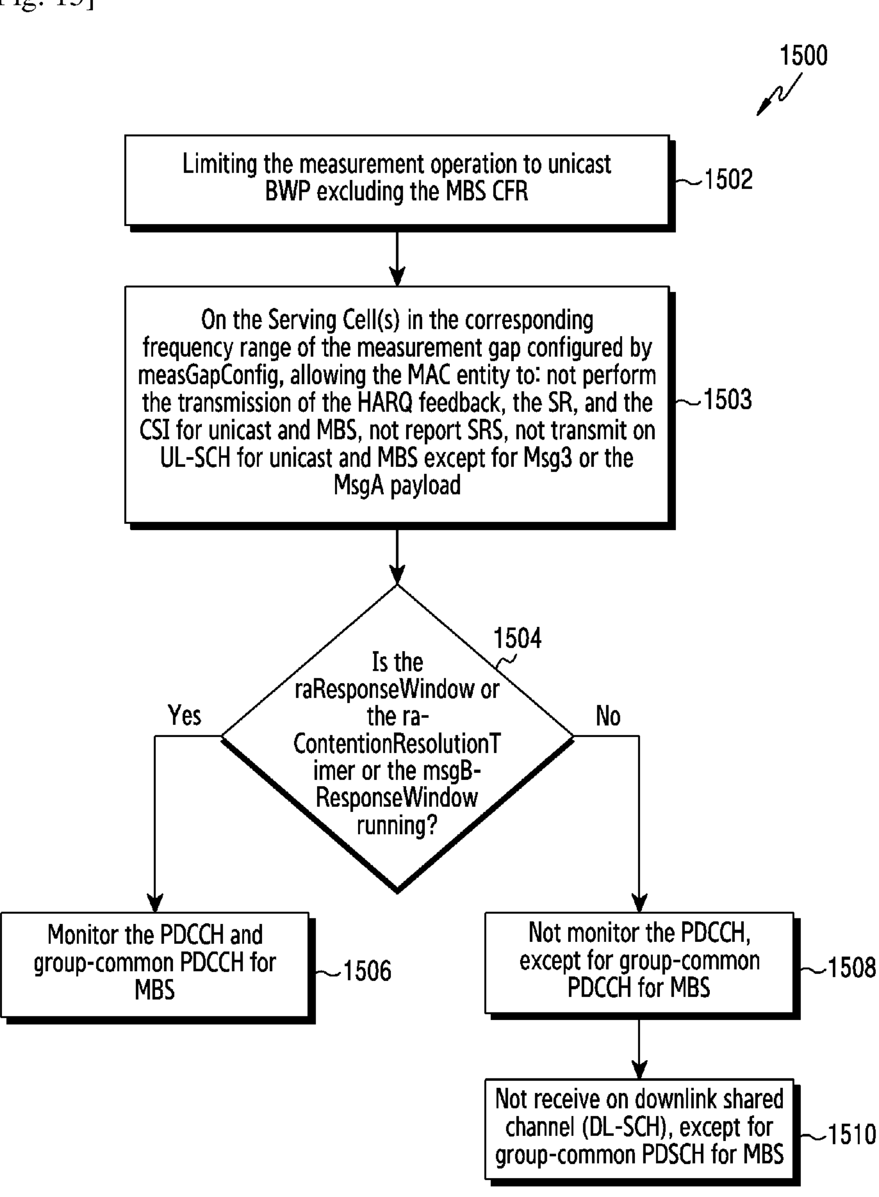

[Fig. 16]
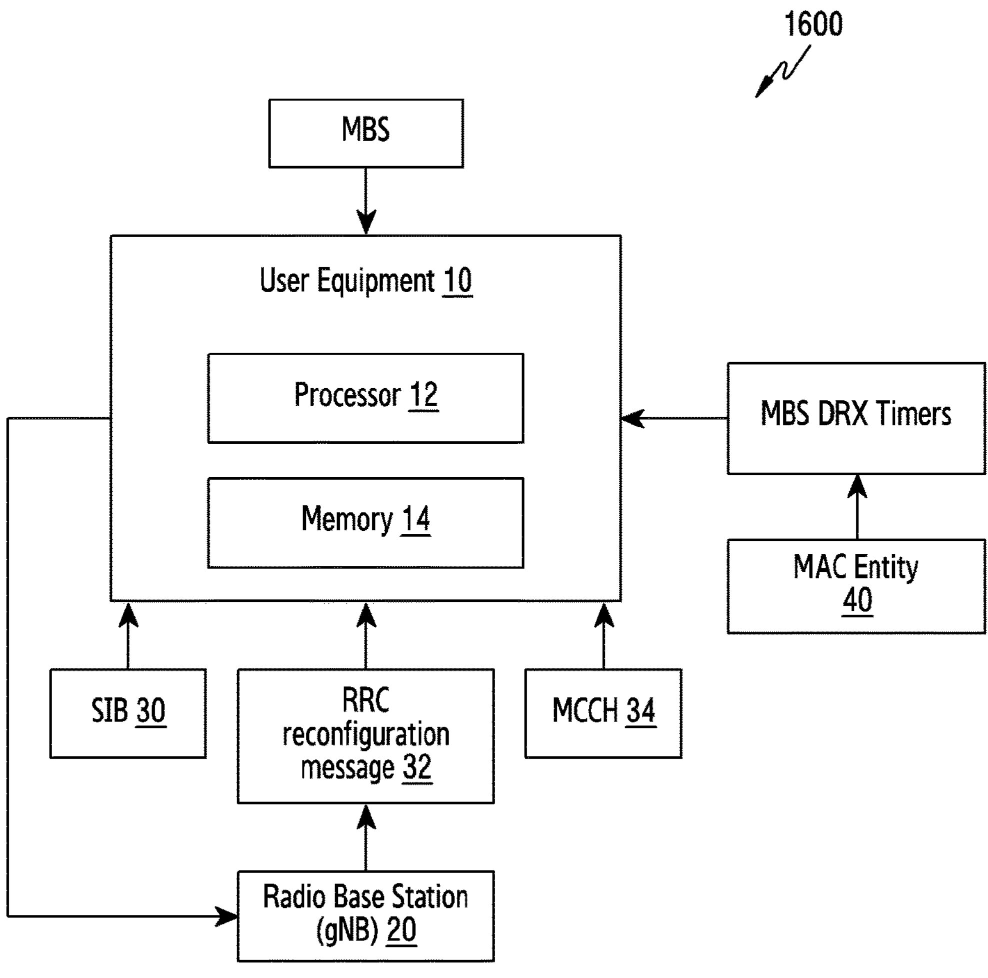
[Fig. 17]
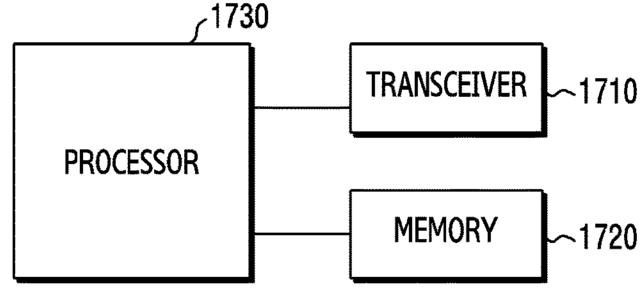
[Fig. 18]
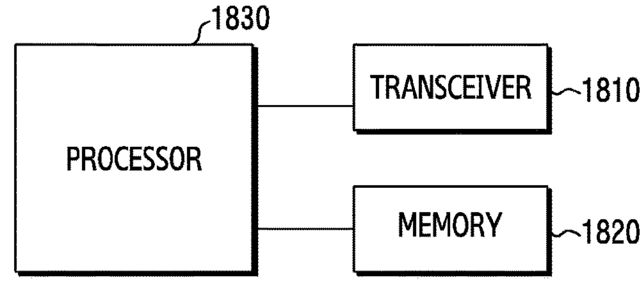

METHOD AND APPARATUS FOR NEW RADIO MULTICAST BROADCAST SERVICE RECEPTION

PRIORITY

This application is a National Phase Entry of PCT International Application No. PCT/KR2022/003466, which was filed on Mar. 11, 2022, and claims priority to Indian patents application Nos. 202141010419 and 202141010419, which were filed on Mar. 12, 2021, and Feb. 23, 2022, respectively, the entire content of each of which is incorporated herein by reference.

TECHNICAL FIELD

Present invention relates to wireless communication networks and more particularly to the efficient and reliable reception for New Radio Multicast Broadcast Service (NR MBS) in wireless communication networks.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

DISCLOSURE OF INVENTION

Solution to Problem

The embodiments herein provide methods and systems for efficient and reliable reception of NR MBS. The embodiments of the present disclosure provides a method of a user equipment (UE) for multicast broadcast service (MBS) discontinuous reception (DRX) in a wireless communication system, the method comprises: receiving, from a base station, a DRX configuration for the MBS corresponding to a group-radio network temporary identifier (G-RNTI) or a group-configured scheduling-RNTI (G-CS-RNTI); monitoring, during an active time for the MBS, a physical downlink control channel (PDCCH) addressed to the G-RNTI or the G-CS-RNTI for the MBS based on the DRX configuration; and receiving, from the base station, the PDCCH addressed to the G-RNTI or the G-CS-RNTI for the MBS, wherein the DRX configuration for the MBS comprises at least one of a drx-onDurationTimerMBS timer, a drx-InactivityTimerMBS timer, a drx-HARQ-RTT-TimerMBS timer, a drx-RetransmissionTimerMBS timer, and a MBS DRX cycle, wherein the MBS DRX cycle is one of a MBS short DRX cycle or a MBS long DRX cycle, and wherein the active time comprises the duration for which at least one of the drx-onDurationTimerMBS timer, the drx-InactivityTimerMBS timer, and the drx-RetransmissionTimerMBS timer is running.

Advantageous Effects of Invention

According to the embodiments of the present invention, methods and apparatus for efficient and reliable reception for New Radio (NR) Multicast Broadcast Service (MBS) are provided.

BRIEF DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

Figure 1B:
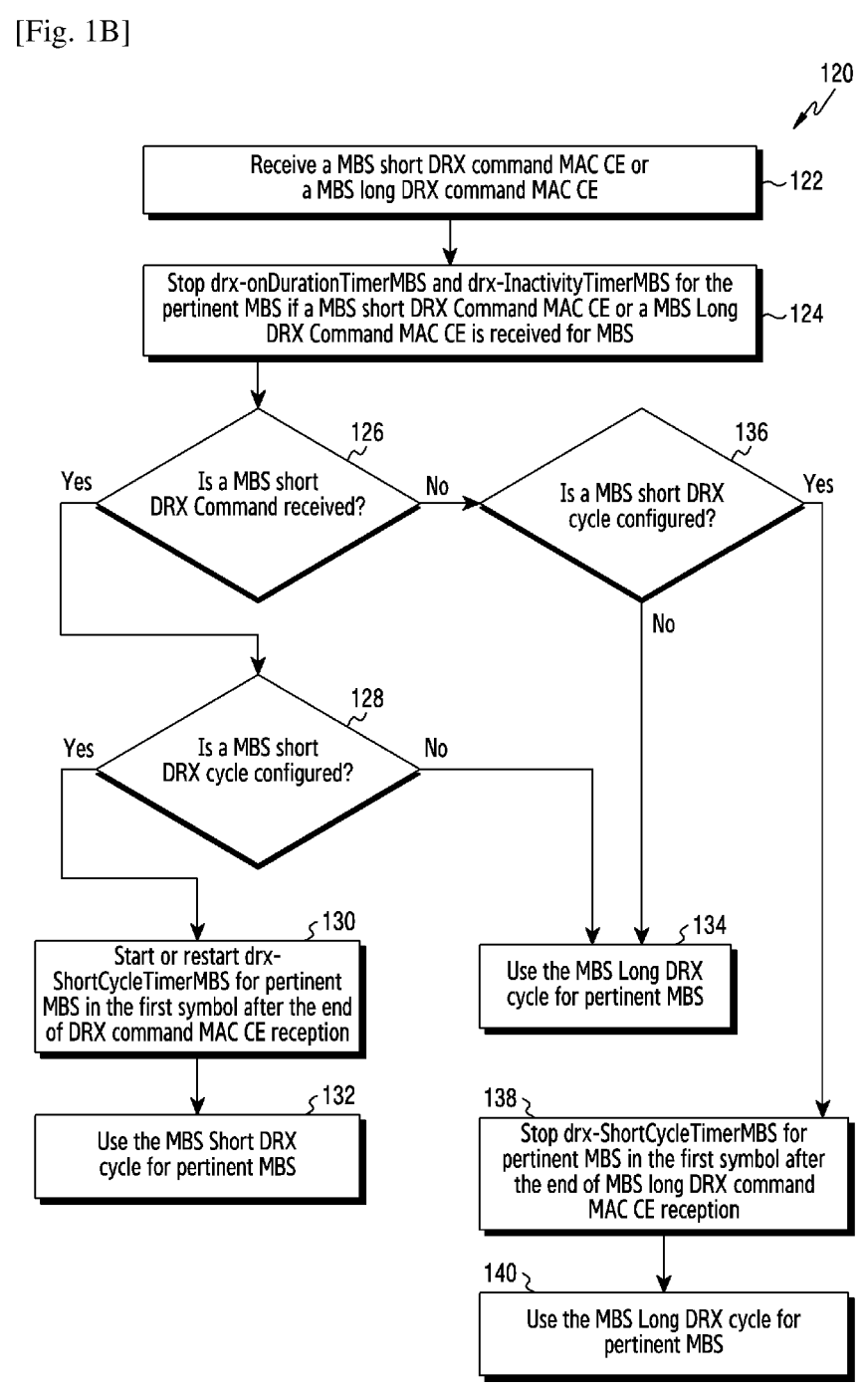

FIG. 1*a* illustrates a method for defining the MBS active time MBS DRX, according to embodiments as disclosed herein;

FIG. 1*b* illustrates a method for a handling a MBS DRX command MAC CE or a MBS Long DRX command MAC CE, according to embodiments as disclosed herein;

FIG. 2*a* illustrates a method for a radio base station (gNB) to configure which retransmission (ReTx) is to be used, according to embodiments as disclosed herein;

FIG. 2*b* illustrates a method for determining which timer to start depending on the kind of ReTx that is expected or configured, according to embodiments as disclosed herein;

FIG. 2*c* illustrates a method for configuring which ReTx is to be used when a physical downlink control channel (PDCCH) indicates a downlink (DL) transmission for one or more radio network temporary identifiers (RNTI), according to embodiments as disclosed herein;

FIG. 2*d* illustrates a method for configuring which ReTx is to be used when a medium access control (MAC) protocol data unit (PDU) is received in a configured DL assignment for MBS, according to embodiments as disclosed herein;

FIG. 3*a* illustrates a method for selecting a HARQ mode for the various states of the UE, according to embodiments as disclosed herein;

FIG. 3*b* illustrates a method for applying a plurality of configurations and settings depending on the Tx mode and ReTx mode, according to embodiments as disclosed herein;

FIG. 4 illustrates a method for MBS channel source information (CSI) reporting in conjunction with a wake-up signal (WUS) operation, according to embodiments as disclosed herein;

FIG. 5 illustrates a method for monitoring by the UE during an explicit switching mode and an implicit switching mode, according to embodiments as disclosed herein;

FIG. 6 illustrates a method for allowing the UE to receive DRX configuration upon a change in the MBS multicast service, according to embodiments as disclosed herein;

FIG. 7 illustrates a method for determining the DRX configuration depending on the MBS bearer, according to embodiments as disclosed herein;

FIG. 8 illustrates a method for determining the various DRX configuration for the PTP delivery, according to embodiments as disclosed herein;

FIG. 9 illustrates a method for configuration of two or more DRX groups by a radio release control (RRC), according to embodiments as disclosed herein;

FIGS. 10*a* and 10*b* illustrate a method for triggering of uplink (UL) transmission for PTP MBS, according to embodiments as disclosed herein;

FIGS. 11*a* and 11*b* illustrate a series of actions performed by a MAC entity when at least one scheduling request (SR) is pending pertaining to PTP MBS, according to embodiments as disclosed herein;

FIG. 12 illustrates a method for the UE to determine whether or not to report MBS CSI, according to embodiments as disclosed herein;

FIG. 13 illustrates a method for determining prioritization between the MBS and the unicast, according to embodiments as disclosed herein;

FIG. 14 illustrates a method for performing a MAC reset, according to embodiments as disclosed herein;

FIG. 15 illustrates a method for monitoring during a measurement gap, according to embodiments as disclosed herein;

FIG. 16 illustrates a system for efficient and reliable reception for NR MBS, according to embodiments as disclosed herein;

FIG. 17 is a block diagram of a configuration of a base station, according to an embodiment of the disclosure; and FIG. 18 is a block diagram showing a structure of a terminal, according to an embodiment of the disclosure.

BEST MODE FOR CARRYING OUT THE INVENTION

The embodiments of the present disclosure provides a method of a user equipment (UE) for multicast broadcast service (MBS) discontinuous reception (DRX) in a wireless communication system, the method comprises: receiving, from a base station, a DRX configuration for the MBS corresponding to a group-radio network temporary identifier (G-RNTI) or a group-configured scheduling-RNTI (G-CS-RNTI); monitoring, during an active time for the MBS, a physical downlink control channel (PDCCH) addressed to the G-RNTI or the G-CS-RNTI for the MBS based on the DRX configuration; and receiving, from the base station, the PDCCH addressed to the G-RNTI or the G-CS-RNTI for the MBS, wherein the DRX configuration for the MBS comprises at least one of a drx-onDurationTimerMBS timer, a drx-InactivityTimerMBS timer, a drx-HARQ-RTT-TimerMBS timer, a drx-RetransmissionTimerMBS timer, and a MBS DRX cycle, wherein the MBS DRX cycle is one of a MBS short DRX cycle or a MBS long DRX cycle, and wherein the active time comprises the duration for which at least one of the drx-onDurationTimerMBS timer, the drx-InactivityTimerMBS timer, and the drx-RetransmissionTimerMBS timer is running.

The embodiments of the present disclosure provides a user equipment (UE) for multicast broadcast service (MBS) discontinuous reception (DRX) in a wireless communication system, the UE comprising: a transceiver; and at least one processor configured to: receive, from a base station, a DRX configuration for the MBS corresponding to a group-radio network temporary identifier (G-RNTI) or a group-configured scheduling-RNTI (G-CS-RNTI), monitor, during an active time for the MBS, a physical downlink control channel (PDCCH) addressed to the G-RNTI or the G-CS-RNTI for the MBS based on the DRX configuration, and receive, from the base station, the PDCCH addressed to the G-RNTI or the G-CS-RNTI for the MBS, wherein the DRX configuration for the MBS comprises at least one of a drx-onDurationTimerMBS timer, a drx-InactivityTimerMBS timer, a drx-HARQ-RTT-TimerMBS timer, a drx-RetransmissionTimerMBS timer, and a MBS DRX cycle, wherein the MBS DRX cycle is one of a MBS short DRX cycle or a MBS long DRX cycle, and wherein the active time comprises the duration for which at least one of the drx-onDurationTimerMBS timer, the drx-InactivityTimerMBS timer, and the drx-RetransmissionTimerMBS timer is running.

Accordingly, the embodiments herein provide methods and systems for efficient and reliable reception of NR MBS. A method disclosed herein for managing MBS for MBS DRX includes configuring a DRX configuration for the MBS that a UE is receiving, wherein the DRX configuration includes at least one MBS DRX timer (drx-onDurationTimerMBS timer, drx-InactivityTimerMBS timer, drx-HARQ-RTT-TimerMBS timer, and drx-RetransmissionTimerMBS timer) and at least one MBS DRX cycle (MBS short DRX cycle or MBS long DRX cycle). The method includes determining an active time for the MBS that the UE is receiving, which is the duration for which the at least one MBS DRX timer is running. The method includes monitoring, during the determined active time, a physical downlink control channel (PDCCH) addressed to a group-radio network temporary identifier (G-RNTI) or a group-configured scheduling-RNTI (G-CS-RNTI) for the MBS indicating a downlink (DL) transmission for the PTM delivery.

Another method disclosed herein for managing MBS reception includes receiving an initial transmission and one of a PTP retransmission, a PTM retransmission or a combination of the PTP retransmission and PTM retransmission, without configuration or as per configuration, wherein the configuration, if provided, is signaled in a radio resource control (RRC) reconfiguration message.

Another method disclosed herein for switching a HARQ feedback or retransmission mode includes configuring, by a radio base station (gNB), a new HARQ feedback or retransmission mode for a MBS bearer. The method includes indication, by the gNB, the new HARQ feedback or retransmission mode in an RRC reconfiguration message or a broadcasted signaling.

Another method disclosed herein for monitoring the G-RNTI or the G-CS-RNTI, and the C-RNTI or the CS-RNTI, by the UE for an explicit switching mode, includes monitoring for the PDCCH or a physical downlink shared channel (PDSCH) depending on the delivery mode that is enabled or configured for a specific MBS bearer.

Another method disclosed herein for includes monitoring, by the UE, the G-RNTI or G-CS-RNTI over a PTM reception path, and the C-RNTI or CS-RNTI over a PTP reception path.

Another method disclosed herein for DRX scheduling or configuration for MBS includes configuring a MBS bearer to have a DRX configuration that is identical to a unicast DRX configuration if the MBS bearer includes a PTP reception path. The method includes configuring the MBS bearer to have a DRX configuration different from the unicast DRX configuration if the MBS bearer includes a PTM reception path.

Another method disclosed herein for responding to uplink data arrival from a higher layer on a MBS PTP bearer includes sending a scheduling request on a physical uplink control channel (PUCCH) or MBS PUCCH. The method includes monitoring, by the UE, for a C-RNTI or CS-RNTI for a PDCCH related to the MBS PTP.

Another method disclosed herein for deriving prioritization among MBS and unicast includes determining, by the UE, a MBS priority and a unicast priority.

Another method disclosed herein for operating a medium access control (MAC) reset by a MAC entity, includes flushing one or more soft buffers for all the downlink (DL) HARQ processes that are not associated with PTP MBS, PTM MBS, or a combination or PTP MBS and PTM MBS. The method includes considering, for each DL HARQ process that is not associated with PTP MBS, PTM MBS, or a combination or PTP MBS and PTM MBS, a subsequent received transmission for a transport block (TB) as the very first transmission.

Accordingly, the embodiments herein provide a system comprising a UE and a MAC entity. The UE is configured to receive the MBS in multiple delivery modes, switch between various states, receive configuration and settings for the HARQ feedback or retransmission mode, monitor the G-RNTI or G-CS-RNTI and the C-RNTI or CS-RNTI for the various switching modes, configure a DRX configuration, and determine an active time for the MBS. The MAC entity is capable of configuring or expecting the kind of retransmission to be used upon the PDCCH indicating a DL transmission for one or more RNTI, or when a MAC protocol data unit (PDU) is received in a configured DL assignment for the MBS, and operate a MAC reset.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the spirit thereof, and the embodiments herein include all such modifications.

Mode for the Invention

Other technical features may be readily apparent to one skilled in the art from the following figures, descriptions, and claims.

Before undertaking the description below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term “controller” means any device, system, or part thereof that controls at least one operation. Such a controller may be implemented in hardware or a combination of hardware and software and/or firmware. The functionality associated with any particular controller may be centralized or distributed, whether locally or remotely. The phrase “at least one of,” when used with a list of items, means that different combinations of one or more of the listed items may be used, and only one item in the list may be needed. For example, “at least one of: A, B, and C” includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

NR MBS can refer to multicast services where common contents are targeted to a group of user equipment (UE) which have joined the multicast group in the multicast coverage area and broadcast services, where the contents are targeted to all the UEs in the broadcast coverage area. These coverages area can be one cell or larger.

Two delivery methods are envisioned for fifth generation (5G) MBS, from the view point of 5G Core Network (CN): Individual MBS traffic delivery method, and shared MBS traffic delivery method.

For the individual MBS traffic delivery method, the CN may receive a single copy of MBS data packets and may deliver separate copies of those MBS data packets to individual UEs via per-UE protocol data unit (PDU) sessions. For the shared MBS traffic delivery method, the 5G CN may receive a single copy of MBS data packets and may deliver a single copy of those MBS packets packet to a Radio Access Network (RAN), which then delivers them to one or multiple UEs. The RAN delivers MBS data to the UEs using either Point-to-Point delivery (PTP) or Point-to-Multipoint (PTM) delivery. Further, at the UE, the MBS bearer can be composed of a common packet data convergence protocol (PDCP) entity with either PTP, PTM or a combination of PTP and PTM legs or RLC (Radio Link Control) entities.

For the purpose of power saving and efficient scheduling, unicast reception is associated with a unicast DRX (Discontinuous Reception) approach. Further, with MBS communication being newly addressed for 5G NR in release-17 of the Third Generation Partnership Project (3GPP), it is desirable to have a DRX approach for reception of MBS on PTM and PTP paths. Unlike LTE eMBMS (Long Term Evolution Evolved Multimedia Broadcast Multicast Service) (which support primarily broadcasted services), NR MBS is also targeted to support higher reliability multicast services for which mechanism for increased reliability (e.g., HARQ (Hybrid Automatic Repeat Request) retransmissions) is needed.

The embodiments herein discloses methods and systems for efficient and reliable reception for New Radio Multicast Broadcast Service (NR MBS).

Another embodiments herein discloses a DRX approach and HARQ transmission and retransmission for MBS packets in order to support power efficient and reliable delivery of 5G MBS.

Another embodiments herein discloses mechanisms that work for the PTM and PTP based delivery framework for NR MBS.

The embodiments herein achieve methods and systems for efficient and reliable reception for New Radio (NR) Multicast Broadcast Service (MBS). Embodiments herein disclose a DRX approach and HARQ transmission and retransmission for MBS packets in order to support power efficient and reliable delivery of 5G MBS. Embodiments herein disclose mechanisms that work for the PTM and PTP based delivery framework for NR MBS.

Embodiments herein consider (existing) unicast DRX and (newly defined) MBS DRX. Each DRX (unicast and MBS) has its own parameters and timers. After initial PTM (by G-RNTI, Group-Radio Network Temporary Identifier or by G-CS-RNTI, Group-Configured Scheduling-Radio Network Temporary Identifier) HARQ transmission, PTP (by C-RNTI, Cell-Radio Network Temporary Identifier or by CS-RNTI, Configured Scheduling-Radio Network Temporary Identifier) HARQ retransmission can be performed. PTM HARQ retransmission is also possible. MBS DRX timers for PTM can include drx-onDurationTimerMBS timer, drx-InactivityTimerMBS timer, drx-Retransmission-TimerMBS timer and drx-HARQ-RTT-TimerMBS timer. In another embodiment, these MBS DRX timers can also be referred to with alternatives such as drx-onDurationTimerPTM timer, drx-InactivityTimerPTM timer, drx-RetransmissionTimerDL-PTM timer and drx-HARQ-RTT-TimerDL-PTM timer, respectively. Additionally, MBS DRX configuration can include a MBS Short DRX cycle (drx-ShortCycleMBS) with a ShortCycleTimerMBS timer and/or a MBS Long DRX cycle (drx-LongCycleMBS and a drx-StartOffsetMBS). In another embodiment, these parameters can also be referred to as drx-ShortCyclePTM, ShortCycleTimerPTM timer, drx-LongCyclePTM and a drx-StartOffsetPTM, respectively.

In another embodiment, the MBS PTP DRX timers can include drx-onDurationTimer timer, drx-InactivityTimer timer, drx-RetransmissionTimerDL timer and drx-HARQ-RTT-TimerDL timer. The MBS PTP DRX may also be configured with drx-RetransmissionTimerUL timer and drx-HARQ-RTT-TimerUL timer, when there an uplink unacknowledged mode (UM) RLC entity is additionally configured or an acknowledged mode (AM) mode RLC is configured for the MBS PTP.

Referring now to the drawings, and more particularly to FIGS. 1*a* through 18, where similar reference characters denote corresponding features consistently throughout the figures, there are shown example embodiments.

Approach 1: Defining the MBS Active Time for MBS DRX (PTM)

FIG. 1*a* illustrates a method 100 for defining the MBS active time for MBS DRX. MBS active time for the UE 10 may be the time it determines for the MBS that the UE 10 is actively receiving, as follows:

For the MBS that the UE 10 is receiving, a medium access control (MAC) entity may:

at step 102, when a DRX cycle is configured for the specific MBS, the active time for the UE 10 receiving the specific MBS can include the time while at least one of the following timers:

drx-onDurationTimerMBS or drx-InactivityTimerMBS configured for the MBS is running; or drx-RetransmissionTimerMBS configured for the MBS is running.

At step 104, the UE may monitor, during the determined active time for the MBS, the PDCCH addressed to a G-RNTI or a G-CS-RNTI for the MBS indicating a DL transmission for the PTM delivery, and receive, during the determined active time for the MBS, the PDCCH addressed to the G-RNTI or the G-CS-RNTI for the MBS.

In an embodiment, for MBS broadcast service, the active time can include the time while at least one of the drx-onDurationTimerMBS timer or the drx-InactivityTimerMBS the configured for the MBS (for example addressed by the G-RNTI or the G-CS-RNTI) is running.

In an embodiment, for MBS multicast service, the active time can include the time while at least one of the drx-onDurationTimerMBS, the drx-InactivityTimerMBS, or the drx-RetransmissionTimerMBS configured for the MBS (for example addressed by the G-RNTI or the G-CS-RNTI) is running. Further, for the MBS multicast service for which the drx-RetransmissionTimerMBS timer is either not configured or is disabled (for example by RRC signaling or DCI signaling), the active time may include the time while at least one of the drx-onDurationTimerMBS timer or the drx-InactivityTimerMBS timer, configured for the MBS (for example addressed by the G-RNTI or the G-CS-RNTI), is running.

At step 106, if the physical downlink control channel (PDCCH) indicates a new downlink (DL) transmission for PTM MBS addressed to G-RNTI or G-CS-RNTI:

start or restart drx-InactivityTimerMBS for this PTM MBS in the first symbol after the end of the PDCCH reception.

If drx-InactivityTimerMBS for a MBS expires at step 108:

at step 110, if a MBS short DRX cycle is configured:

then at step 112, start or restart drx-ShortCycleTimerMBS for the pertinent MBS in the first symbol after the expiry of drx-InactivityTimerMBS; and at step 114, use the MBS Short DRX cycle for the pertinent MBS.

else:

at step 116 use the MBS Long DRX cycle for the pertinent MBS. MBS DRX Command MAC CE and/or a MBS Long DRX Command MAC CE may be signaled to the UE 10 which is receiving the PTM MBS. The MAC CEs may be identified with specific LC IDs (logical channel identities) and/or mapped to the physical downlink shared channel (PDSCH) and addressed with the G-RNTI or G-CS-RNTI used for the relevant PTM MBS. Different types of MBS could pertain to low latency and high latency requirements and dynamic scheduling aspects. Therefore, DRX configuration for these services can have short DRX cycle and/or long DRX cycle parameters configured. The network can also dynamically alter the DRX operation between short DRX cycle and long DRX cycle with utilizing at least one of the MAC CEs. In one embodiment, the configuration for short DRX cycle and/or long DRX cycle and associated MAC CEs usage can be limited to the MBS multicast services being availed in connected mode only and/or broadcast services.

FIG. 1*b* illustrates a method 120 for handling a MBS DRX command MAC CE or a MBS Long DRX command MAC CE, according to embodiments as disclosed herein.

At step 122, if a MBS short DRX command MAC CE or a MBS Long DRX command MAC CE is received for the MBS, then at step 124:

stop drx-onDurationTimerMBS for the pertinent MBS; and stop drx-InactivityTimerMBS for the pertinent MBS.

At step 126, if MBS Short DRX Command MAC CE for the MBS is received, then:

at step 128, if a MBS Short DRX cycle is configured:

then at step 130, start or restart drx-ShortCycleTimerMBS for the pertinent MBS in the first symbol after the end of the MBS short DRX command MAC CE reception; and at step 132, use the MBS Short DRX cycle for the pertinent MBS.

else:

at step 134 use the MBS Long DRX cycle for the pertinent MBS.

If the MBS Long DRX Command MAC CE for the MBS is received:

at step 136, if a MBS Short DRX cycle is configured:

then at step 138, stop the drx-ShortCycleTimerMBS for the pertinent MBS in the first symbol after the end of the MBS Long DRX command MAC CE reception; and at step 140, use the MBS Long DRX cycle for the pertinent MBS.

else:

at step 134 use the MBS Long DRX cycle for the pertinent MBS.

During the MBS active time, the UE 10 may monitor at least one of the following bandwidth parts (BWP) or frequency resources or a combination of them as:

Dedicated unicast BWP(s);

One or more MBS BWPs;

One or more MBS common frequency resources or regions (CFR);

One or more MBS BWPs or MBS CFRs relevant to the pertinent and active MBS;

Initial BWP;

Default BWP;

One or more configured MBS BWPs for broadcast services;

One or more configured MBS CFRs for broadcast services;

One or more MBS control resource set (CORESET);

CORESET having an index value of 0 which allows system information block (SIB) 30 or paging reception as well;

One or more multicast broadcast service control channel (MCCH) 34 bandwidth or CFRs; and One or more configured MBS BWPs or MBS CFRs relevant to the pertinent and active MBS broadcast service.

When the UE 10 is in idle/inactive state, at least one from a set of the above BWP/CFR/CORESET/bandwidth may be monitored (for example, dedicated unicast BWPs are excluded for the subset). Relevant configuration and signaling may be provided to the UE 10 by at least one of the SIB 30 and the MCCH 34.

When the UE 10 is in connected mode at least one from a set of the above BWP/CFR/CORESET/bandwidth may be monitored. Relevant configuration and signaling may be provided to the UE 10 by at least one of the SIB 30, the MCCH 34, and a Radio Release Control (RRC) reconfiguration message 32.

Further, the number of BWPs/CFRs/CORESETS that a UE 10 can monitor may also be linked with the UE 10 capability, and the UE 10 may indicate this to a radio base station (gNodeB) 20 in the UE 10 capability information message. Furthermore, the UE 10 can inform its priority for MBS and unicast, and/or its preference for BWP/CFR/CORESET in a MBS interest indication message. It is to be noted that the radio base station, gNodeB, may also be referred to herein as gNB.

Approach 2: HARQ Round Trip Time (RTT) Timer Operation Upon MBS Reception

For efficient DRX operation, the gNB 20 can configure which retransmission (ReTx) is used, as illustrated by the method 200 in FIG. 2*a*. One of the following kinds of ReTx may be expected or configured:

at step 202, start drx-HARQ-RTT-TimerDL if PTP ReTx is expected or configured;

at step 204, start drx-HARQ-RTT-TimerMBS if PTM ReTx is expected or configured;

at step 206, start drx-HARQ-RTT-TimerDL if PTP ReTx is expected or configured and start drx-HARQ-RTT-TimerMBS if PTM ReTx is expected or configured; and No ReTx is expected or configured.

The UE 10 may also receive one of the following:

a. the PDCCH indicating the DL transmission addressed to the G-RNTI or the G-CS-RNTI, or the C-RNTI or the CS RNTI; or b. the MAC PDU in a configured DL assignment for the MBS.

For efficient DRX operation, the gNB 20 can configure which retransmission (ReTx) is used, as illustrated by the method 210 in FIG. 2*b*. One of the following kinds of ReTx may be expected or configured:

at step 212, start drx-HARQ-RTT-TimerDL for the corresponding HARQ process in the first symbol after the end of the corresponding transmission carrying the DL HARQ feedback if PTP ReTx is expected or configured;

at step 214, start drx-HARQ-RTT-TimerMBS for the corresponding HARQ process in the first symbol after the end of the corresponding transmission carrying the DL HARQ feedback if PTM ReTx is expected or configured;

at step 216, start drx-HARQ-RTT-TimerDL for the corresponding HARQ process in the first symbol after the end of the corresponding transmission carrying the DL HARQ feedback if PTP ReTx is expected or configured and start drx-HARQ-RTT-TimerMBS for the corresponding HARQ process in the first symbol after the end of the corresponding transmission carrying the DL HARQ feedback if PTM ReTx is expected or configured; and No ReTx is expected or configured.

The configuration for which retransmission (ReTX) is used may be provided to the UE 10 in the RRC reconfiguration message 32.

According to the method 220 as illustrated in FIG. 2*c*, if at step 222, the PDCCH indicates a DL transmission for G-RNTI or G-CS-RNTI, or C-RNTI or CS-RNTI (scheduling MBS PDSCH), the MAC entity 40 may:

at step 224, if only PTP ReTx is expected (or configured):

Start drx-HARQ-RTT-TimerDL; and

If drx-HARQ-RTT-TimerDL is expired and the data of the corresponding HARQ process was not successfully decoded: start drx-RetransmissionTimerDL for the corresponding HARQ process in the first symbol after the expiry of drx-HARQ-RTT-TimerDL.

at step 226, if only PTM ReTx is expected (or configured):

Start drx-HARQ-RTT-TimerMBS; and

If drx-HARQ-RTT-TimerMBS is expired and the data of the corresponding HARQ process was not successfully decoded: start the drx-RetransmissionTimerMBS for the corresponding HARQ process in the first symbol after the expiry of drx-HARQ-RTT-TimerMBS.

at step 228, if both PTM ReTx and PTP ReTx are expected (or configured):

Start drx-HARQ-RTT-TimerMBS and drx-HARQ-RTT-TimerDL;

If drx-HARQ-RTT-TimerMBS is expired and the data of the corresponding HARQ process was not successfully decoded: start the drx-RetransmissionTimerMBS for the corresponding HARQ process in the first symbol after the expiry of drx-HARQ-RTT-TimerMBS; and If drx-HARQ-RTT-TimerDL is expired and the data of the corresponding HARQ process was not successfully decoded: start the drx-RetransmissionTimerDL for the corresponding HARQ process in the first symbol after the expiry of drx-HARQ-RTT-TimerDL.

In other embodiments, the drx-HARQ-RTT-TimerDL and the drx-HARQ-RTT-TimerMBS may start as dictated by the methods 200 and 210.

According to the method 230 as illustrated in FIG. 2*d*, at step 232, if a MAC protocol data unit (PDU) is received in a configured DL assignment for MBS (i.e., MBS SPS), the MAC entity 40 may:

at step 234, if only PTP ReTx is expected (or configured):

Start drx-HARQ-RTT-TimerDL; and

If drx-HARQ-RTT-TimerDL has expired and the data of the corresponding HARQ process was not successfully decoded: start the drx-RetransmissionTimerDL for the corresponding HARQ process in the first symbol after the expiry of the drx-HARQ-RTT-TimerDL.

at step 236, if only PTM ReTx is expected (or configured):

Start drx-HARQ-RTT-TimerMBS; and

If drx-HARQ-RTT-TimerMBS is expired and the data of the corresponding HARQ process was not successfully decoded: start the drx-RetransmissionTimerMBS for the corresponding HARQ process in the first symbol after the expiry of the drx-HARQ-RTT-TimerMBS.

at step 238, if both PTM ReTx and PTP ReTx are expected (or configured):

Start drx-HARQ-RTT-TimerMBS and drx-HARQ-RTT-TimerDL;

If drx-HARQ-RTT-TimerMBS is expired and the data of the corresponding HARQ process was not successfully decoded: start the drx-RetransmissionTimerMBS for the corresponding HARQ process in the first symbol after the expiry of the drx-HARQ-RTT-TimerMBS; and If drx-HARQ-RTT-TimerDL is expired and the data of the corresponding HARQ process was not successfully decoded: start the drx-RetransmissionTimerDL for the corresponding HARQ process in the first symbol after the expiry of the drx-HARQ-RTT-TimerDL.

In other embodiments, the drx-HARQ-RTT-TimerDL and the drx-HARQ-RTT-TimerMBS may start as dictated by the methods 200 and 210.

In an embodiment herein, when the UE 10 wakes up for monitoring for PTM or PTP, the UE 10 may monitor both G-RNTI/G-CS-RNTI and C-RNTI/CS-RNTI. Thereby, the UE 10 may receive PTP and PTM initial transmission as well as PTP retransmission and/or PTM retransmissions together.

Approach 3: Switching to Different HARQ Retransmission Mode

In an embodiment herein, as illustrated by the method 300 in FIG. 3*a*, the gNB 20 may configure for the HARQ mode (also referred to herein as HARQ feedback mode or HARQ retransmission mode) for the MBS bearer. At step 302, an applicable HARQ mode is selected for the UE 10 when it is in a connected state. The applicable HARQ mode may be indicated in the bearer configuration information in the RRC reconfiguration message 32 for the connected mode UE 10. At step 304, an applicable HARQ mode for when the UE is in an inactive or idle state is selected. When the UE 10 is in idle and/or inactive mode, the applicable HARQ mode may be specified in the broadcasted signaling for the MBS bearer configuration; for example, SIB 30 or MCCH 34. The applicable HARQ mode may be configured to have a specific configuration for individual MBS or per group of MBS or for all MBS. Further, the applicable HARQ mode may be defined for downlink direction and/or uplink direction or as a common parameter.

In an embodiment herein, at step 406, if the applicable HARQ mode is not configured, then the default mode may be applied. The default mode can be acknowledgement (ACK)/negative-ACK (NACK) based HARQ mode. Alternatively, the default mode can be No HARQ retransmission mode (also referred to herein as HARQ-less retransmission mode).

Applicable mode for connected mode UE 10 may include at least one of:

ACK/NACK based HARQ retransmission mode,

NACK only based HARQ retransmission mode, feedback-less HARQ retransmission mode, and No HARQ retransmission mode.

Applicable mode for idle and/or inactive mode UE 10 may include at least one of:

Feedback-less HARQ retransmission mode, and

No HARQ retransmission mode.

In an embodiment herein, when the UE 10 transits to or is configured/indicated to transit to idle and/or inactive state, the applicable HARQ mode may be changed to either feedback-less HARQ retransmission mode or No HARQ retransmission mode. This can be explicitly configured to the UE 10 or the UE 10 implicitly applies, for example, when there is state transition. It is to be noted that the terms 'mode' and 'state' are used interchangeably.

In an embodiment herein, explicit indication for use of HARQ ReTx for PTP may be needed i.e., PTP may be used only for HARQ ReTx of PTM MBS packets and not PTP MBS packets etc.

In an embodiment herein, it may be specified or configured whether PTM ReTX or PTP ReTx or both are applied. This configuration may be changed when there is explicit switching between PTM, PTP and PTM+PTP delivery modes. When implicit switching is used (i.e., UE 10 is not made aware which paths, PTP or PTM or both will receive MBS packets), the UE 10 may be specified or configured with whether PTM ReTX or PTP ReTx or both are applied.

In another embodiment, as illustrated by the method 310 in FIG. 3*b*, the following configuration and settings may be applied as:

at step 312, if there is initial Tx on PTM and ReTx on PTM (good coverage and more UEs 10)—then maximum retransmission (MaxReTx) for PTM is based on some fixed number based on weakest UE (e.g. at cell edge or poor coverage) or some averaging based on HARQ ACK from many UE 10*s;* at step 314, if there is initial Tx on PTM and ReTx on PTP (some UEs 10 in less coverage), then PTP ReTx is based on HARQ ACK from UE 10*s* (PTP specific MaxReTx for the UE 10, however new transmission timing may be controlled by PTM as above), and new PTM transmission by G-CS-RNTI or other G-RNTI or new PTP transmission by C-RNTI or CS-RNTI may override the HARQ buffer (i.e. new data indicator (NDI) is considered as toggled regardless of the value of NDI). This further considers that if the current assignment is for G-RNTI and the previous assignment was for CS-RNTI or G-CS-RNTI or other G-RNTI or C-RNTI, then the NDI may be considered to be toggled regardless of the value of the NDI; and at step 316, if there is initial Tx on PTP and ReTx on PTP (only poorer coverage UEs 10), then PTP ReTx is based on HARQ ACK from UE 10*s* (PTP specific MaxReTx), and new PTP transmission by CS-RNTI or new PTM transmission by G-RNTI or G-CS-RNTI (i.e. NDI is considered as toggled regardless the value of NDI) may override the HARQ buffer. This further considers that if the current assignment is for C-RNTI and if the previous assignment was for the same HARQ process that was for CS-RNTI or G-CS-RNTI, then the NDI may be considered to be toggled regardless of the value of the NDI.

The configurations and settings for the HARQ transmission/retransmission (for example, MaxRcTx, Type of ReTX like PTP ReTX or PTM ReTX or both) may be provided to the UE 10 in the RRC reconfiguration message 32 for PTM multicast services (connected mode), SIB 30 or MCCH 34 for broadcast service (idle/inactive and connected mode), and the RRC reconfiguration message 32 for PTP reception. The configuration and settings can be provided and applied for an individual MBS or for all multicast service or for all broadcast services or for all PTM service or for all PTP services or for all MBS in general for the UE 10.

At the time of switching, for example, between PTM and PTP and PTM+PTP modes, the UE 10 may apply the relevant configuration from the pre-configured/pre-provided configurations for these modes and/or may be explicitly provided with a new set of configuration for applicable mode by the gNB 20 in the RRC reconfiguration message 32.

Activation (or enabling) and/or deactivation (or disabling) of the HARQ feedback can be based on at least one of or a combination of:

- RRC signaled enabling and/or disabling for the HARQ feedback for the MBS service;
- DCI (Downlink control Information) based enabling and/or disabling for the HARQ feedback for MBS service addressed by G-RNTI or G-CS-RNTI;
- MAC CE based signaled activation and/or deactivation for the HARQ feedback;
- Signal strength (e.g. Signal to Interference Noise Ratio (SINR), Reference Signal Received Power (RSRP), Received Signal Strength Indicator (RSSI), Channel Quality indicator (CQI) etc.) threshold or threshold range based activation and/or deactivation for the HARQ feedback;
- Block Error Rate or retransmission rate based activation and/or deactivation for the HARQ feedback;
- RRC state transition, for example, connected/idle/inactive based activation and/or deactivation for the HARQ feedback; and
- Based on relevant MBS activation and/or deactivation or suspend and/or resume, for example, by MAC CE, DCI, RRC signaling or NAS signaling.

Configuration for activation and/or deactivation of the HARQ feedback may be provided by RRC signaling (for example, RRC reconfiguration message 32). Activation and/or deactivation specified here may also mean enabling and/or disabling.

Scope of configuration and/or activation and/or deactivation may be defined as follows:

- Configuration and/or activation and/or deactivation of HARQ feedback can be per HARQ process;
- Configuration and/or activation and/or deactivation of HARQ feedback can be per MBS multicast service; and
- Configuration and/or activation and/or deactivation of HARQ feedback can be for MBS multicast in general.

In an embodiment herein, scope for configuration and scope for activation and/or deactivation can be different (for example, Configuration scope may be for MBS multicast in general, but scope for activation and/or deactivation may be per MBS multicast service)

In an embodiment herein, the mechanism for whether a physical layer will generate or not generate an acknowledgement (HARQ feedback) may be specified.

For the generation of the MBS HARQ feedback, the MAC entity 40 may:

- if the HARQ process is associated with a transmission indicated with a Temporary C-RNTI and the Contention Resolution is not yet successful;
- if the HARQ process is associated with a transmission indicated with a MSGB-RNTI and the Random Access procedure is not yet successfully completed;
- if the HARQ process is equal to the broadcast process;
- if the HARQ process is configured by the RRC or associated for feedback-less HARQ or no HARQ retransmission mode;
- if the HARQ process is configured by the RRC or associated for NR MBS broadcast service;
- if the HARQ process (or relevant MBS) is configured by the RRC for a signal strength thresholds range and/or a channel quality (CQI) threshold and/or a block error rate (BLER) threshold which is not satisfied;
- if the HARQ process is configured by the RRC or associated for NACK only HARQ feedback and the MBS MAC PDU is successfully decoded;
- if the HARQ process pertains to NR MBS which is configured by the RRC or associated for MBS physical uplink control channel (PUCCH) with lesser priority than the unicast PUCCH, and the MBS PUCCH conflicts with timing of the unicast PUCCH; or
- if the timeAlignmentTimer (TAT) timer, associated with the timing advance group (TAG) containing the Serving Cell on which the HARQ feedback is to be transmitted, is stopped or expired:
- not instruct the physical layer to generate acknowledgement(s) of the data in this transport block (TB).
- else:
- instruct the physical layer to generate acknowledgement(s) of the data in this TB.

In an embodiment herein, it may be specified that when the MBS HARQ feedback is mapped to either the unicast PUCCH or the MBS PUCCH. It may be configured by the RRC configuration which PUCCH resource is used. Alternatively, the UE 10 can determine which PUCCH to use for the HARQ feedback based on at least one of the following:

- Always unicast PUCCH (i.e. MBS HARQ feedback is always mapped to unicast PUCCH);
- Always MBS PUCCH (i.e. MBS HARQ feedback is always mapped to MBS PUCCH);
- MBS PUCCH when it is configured;
- MBS PUCCH when ACK-NACK based HARQ feedback is configured;
- Unicast PUCCH when NACK based HARQ feedback is configured;
- Based on priority of multicast with respect to unicast (for example, on MBS PUCCH when multicast is higher priority than unicast);
- Specific MBS PUCCH pertaining to MBS CFR or BWP;
- In accordance of active time of multicast and/or unicast;
- Based on priority of MBS PUCCH and unicast PUCCH (for example, MBS HARQ feedback is mapped to higher priority PUCCH);
- Unicast PUCCH when MBS PUCCH conflicts with unicast PUCCH timing;
- Not transmit MBS HARQ feedback when MBS PUCCH conflicts with unicast PUCCH timing;
- Not transmit MBS HARQ feedback when MBS PUCCH priority is lesser than that for unicast PUCCH;
- Not transmit MBS HARQ feedback when SR priority is higher than that for MBS HARQ feedback;
- Transmit MBS HARQ feedback on unicast PUCCH when MBS HARQ feedback priority is higher than that for SR; and
- Multiplex MBS HARQ feedback and/or PTP SR along with unicast HARQ feedback and/or SR when they are equal priority or MBS HARQ feedback is higher priority.

Approach 4: MBS Channel State Information (CSI) Reporting in Conjunction With Wake-up Signal (WUS) Operation In one embodiment, as illustrated by method 400 in FIG. 4, the MBS measurements and the MBS CSI reporting may also be pursued over the drx-onDuration for which, at step 402, the drx-onDurationTimer may not be started due to the WUS indicating no DCI allocation. The UE 10 may report and/or transmit periodic unicast CSI and/or MBS CSI over the unicast PUCCH and/or the MBS PUCCH.

- at step 404, when the UE 10 is configured with ps-TransmitOtherPeriodicCSI, the UE 10 may report periodic CSI that is not layer-1 (L1)-reference signal received power (RSRP) on the PUCCH or the MBS PUCCH during the time duration indicated by drx-onDurationTimer in case DCP (DCI with cyclic redundancy check (CRC) is scrambled by power-saving RNTI (PS-RNTI)) is configured but associated drx-onDurationTimer is not started;
- at step 406, when the UE 10 is configured with ps-TransmitPeriodicL1-RSRP, the UE may transmit periodic CSI that is L1-RSRP on the PUCCH or the MBS PUCCH during the time duration indicated by drx-onDurationTimer in case DCP is configured but associated drx-onDurationTimer is not started.

In an embodiment, PTM reception may be pursued irrespective of the WUS indication of no DCI allocation or DCI allocation for unicast.

In another embodiment, PTP ReTX for PTM may be pursued over the drx-onDuration for which the drx-onDurationTimer is not started due to the WUS indicating no DCI allocation. Furthermore, PTP ReTX for PTM may be pursued over the skipped DRX cycle for which the WUS indicated no DCI allocation. Alternatively, gNB does not schedule PTP ReTX for PTM during the drx-onDuration for which the drx-onDurationTimer is not started due to the WUS indicating no DCI allocation. gNB may schedule PTM based Retransmission for PTM initial transmission during this time.

Approach 5: Monitoring G-RNTI/G-CS-RNTI and C-RNTI/CS-RNTI

As illustrated by method 500 in FIG. 5, at step 502, with explicit switching mode, at least one of or a combination of the below may be employed as:

- at step 504, the UE 10 monitors G-RNTI/G-CS-RNTI for a PDCCH and PDSCH over PTM reception path when PTM mode is enabled or configured for a specific MBS bearer;
- at step 506, the UE 10 monitors C-RNTI/CS-RNTI for PDCCH and G-RNTI/G-CSRNTI for PDSCH when PTM mode is enabled or configured for the specific MBS bearer;
- at step 508, the UE 10 monitors C-RNTI/CS-RNTI for a PDCCH and PDSCH over PTP reception paths when PTP mode is enabled or configured for the specific MBS bearer;
- at step 510, the UE 10 monitors both G-RNTI/G-CS-RNTI for a PDCCH and PDSCH over PTM reception path and C-RNTI/CS-RNTI for a PDCCH and PDSCH over PTP reception path when PTM+PTP mode is enabled or configured for the specific MBS bearer;
- at step 512, the UE 10 monitors, temporarily, both G-RNTI/G-CS-RNTI over PTM reception paths and C-RNTI/CS-RNTI over PTP reception paths when there is switching across PTM and PTP modes. The temporary duration is specified or configured or indicated (for start and end) during switching procedure. The temporary duration can be implemented by a timer; and
- at step 514, the UE 10 monitors G-RNTI/G-CS-RNTI over PTM and C-RNTI/CS-RNTI over PTP irrespective of the MBS bearer mode.

At step 516, with implicit switching mode, the UE 10 may monitor both G-RNTI/G-CS-RNTI over PTM reception paths and C-RNTI/CS-RNTI over PTP reception paths.

Approach 6: Accounting for Unicast DRX Configuration Based on MBS Reception for UE 10

In an embodiment herein, as illustrated by method 600 in FIG. 6, the unicast DRX configuration may be set/configured/adapted by the gNB 20 for the UE 10 considering the active MBS multicast services which could be received in PTM+PTP mode (i.e., MBS split bearer).

Based on the applicable MBS multicast service(s) that the UE 10 is actively receiving, the UE 10 may be configured with the unicast DRX configurations. At step 602, the UE 10 may encounter a change in the MBS multicast services it is receiving. When there is a change of MBS multicast service(s), for example, a new multicast is added or an existing multicast is removed, the UE 10 may be configured with an updated unicast DRX configuration. At step 604, the updated unicast DRX configuration may be provided to the UE 10 by the gNB 20 through the RRC reconfiguration message 32. The updated unicast DRX configuration may consider the MBS multicast service being added or being removed and their associated MBS DRX scheduling/configuration, so that, at step 606, in accordance with the updated DRX configuration, the UE 10 can continue receiving PTP and/or unicast (Tx and/or ReTx) reception on downlink as well as PTP and/or unicast transmission on uplink along with PTM reception for the MBS bearers. As an example, at least one of the unicast DRX configuration parameters like DRX On duration, DRX offset, DRX inactivity, DRX cycle length can be matched or configured as similar to the at least one of the respective parameters for MBS DRX parameters.

Approach 7: DRX for MBS Bearer (PTM+PTP)

In an embodiment herein, the DRX scheduling/configuration for the MBS may be defined together for both PTM and PTP reception paths for the MBS bearer (i.e., MBS split bearer which is having PTM leg and PTP leg). This may also imply that the same set of DRX timers and parameters are utilized for PTM and PTP reception. Additionally, PTP may have uplink related DRX and HARQ transmission/retransmission timers and parameters.

According to the method 700 as illustrated in FIG. 7, at step 702. if the MBS bearer is comprising of PTP only reception path, the DRX configuration for the MBS bearer can be same as the unicast DRX configuration or different from the unicast DRX configuration.

At step 704, if the MBS bearer is comprising of PTM only reception path, the DRX configuration for the MBS bearer can be different from the unicast DRX configuration. The unicast DRX configuration can be updated to support the uplink transmission/retransmission and/or uplink signaling pertaining to PTM reception.

In an embodiment herein, the DRX scheduling/configuration for MBS may be defined together for both PTM and PTP reception paths for the MBS bearer (i.e., MBS split bearer which is having PTM leg and PTP leg). In this case, different set of DRX timers and parameters may be utilized for PTM and PTP reception. Additionally, PTP may have uplink related DRX and HARQ transmission/retransmission timers and parameters. Furthermore, the PTP DRX configuration can be same as that for unicast DRX configuration or can be different also from the unicast DRX configuration.

Approach 8: Alignment for MBS and Unicast DRX

In an embodiment herein, alignment of DRX can be achieved between the unicast (UE 10 specific) and the multicast (group-common). There may be frequent DRX overriding due to uncoordinated scheduling of PTM and PTP/unicast reception (and associated transmissions, for example, uplink control information (UCI), HARQ ACK NACK (A/N)). One optimization can be to allow the UE 10 to involve in UCI and HARQ A/N (and, if needed, MBS CSI feedback, measurement report) transmission for PTM, only when it is aligned with PTP DRX active time, which may be still effective for group-common scheduled system where many UEs provide the MBS CSI feedback and measurement. Then, the unicast PUCCH or the MBS specific PUCCH can be utilized effectively.

In an embodiment herein, alignment of DRX can be achieved between the unicast (UE 10 specific) and the multicast (group-common) by providing the UE 10 with the same drx-SlotOffset for the unicast DRX configuration as that for the MBS DRX configuration i.e., drx-SlotOffsetMBS. Similarly, other parameters like DRX cycle, drx-onDurationTimer, drx-InactivityTimer can be configured.

Approach 9: Separate UE 10-specific RNTI for PTP (Other than C-RNTI/CS-RNTI)

In an embodiment herein, as illustrated by method 800 in FIG. 8, at step 802, PTP delivery mode may be assigned a UE 10 specific RNTI (for example, PTP-RNTI) which may be distinct from the C-RNTI/CS-RNTI used for unicast reception. Consequently, there can be two possibilities for DRX configuration for PTP delivery as follows:

- at step 804, if the PTP DRX is the same as the associated PTM DRX, then the PTP may be linked to the PTM for the HARQ retransmission and/or RLC/PDCP retransmission of MBS packets. PTP DRX configuration being the same as that of the PTM can facilitate the PTP reception timings to better align with PTM. Since the MBS packets arrival at the gNB 20 is identical for the PTM and PTP, the scheduling of the MBS packets can also happen at the same time. Resultantly, the sequence number gap between the PTM and the PTP delivery path may also be reduced.
- at step 806, if the PTP DRX is the same as the unicast DRX, even though PTP has same DRX configuration as that for unicast reception, then with the PTM MBS reception, there can be linkage between the PTM and the PTP (for example, for HARQ retransmission). As a result, the unicast active time may be activated when PTM reception is pursued. However, decoding the unicast reception in the extended unicast DRX active can cause significant PDCCH blind decoding for C-RNTI/CS-RNTI, while the gNB 20 may not have any unicast data available for scheduling. With distinct PTP-RNTI, the UE 10 may be scheduled only for PTP reception, when the PTM reception is pursued and requires HARQ retransmission, whereas unicast C-RNTI/CS-RNTI allocation may be pursued in the original DRX active time. This way unicast reception and associated operations, for example, channel state information reference signal (CSIRS) measurements, CSI reporting etc. may not be affected by PTM reception.

In an embodiment herein, PTP-RNTI may be used only for the purpose of receiving PTM HARQ ReTX over PTP. That is, PTP-RNTI may not be used for regular PTP reception and C-RNTI/CS-RNTI may be used for regular (i.e. MBS packets) PTP reception and transmission. In this approach, PTP-RNTI based PTM HARQ ReTX over PTP reception may be following MBS DRX configuration timings whereas C-RNTI/CS-RNTI based regular PTP reception may follow unicast DRX configuration timings.

Approach 10: Dual or more DRX Configuration

In an embodiment herein, as illustrated by method 900 in FIG. 9, at step 902, the Serving Cells of a MAC entity 40 may be configured by the RRC in two or more DRX groups with separate DRX parameters. When the RRC does not configure a secondary or further DRX group, there may be only one DRX group and all Serving Cells belong to that one DRX group. When two DRX groups are configured, at step 904, each Serving Cell, including all the MBS PTP(s) reception for the UE 10, may be uniquely assigned to either of the two or more groups. The DRX parameters that may be separately configured for each DRX group are: drx-onDurationTimer, drx-InactivityTimer. The DRX parameters that may be common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

At step 906, PTP DRX configuration may be provided with the DRX group indication in the RRC reconfiguration message 32 or the DRX group for the PTP may be determined from the DRX group indication for the Serving Cell(s) over which the MBS PTP is received.

Approach 11: Uplink Transmissions for PTP MBS

According to the method 1000, as illustrated in FIGS. **10*a* and 10*b*, at step 1002, the uplink transmission for the PTP may be triggered when there is transmission for radio link control (RLC) status PDU and/or RLC data PDU carrying PDCP status PDU, PDCP Interspersed robust header compression (ROHC) feedback packet, MBS measurement report, MBS UE 10 assistance information message etc. At step 1004**, arrival of layer-2 (L2) packets may trigger buffer status report (BSR), which may, in turn, trigger scheduling request (SR) over the unicast PUCCH and/or the MBS PUCCH, or random access when pertinent PUCCH resources are not available. When there are uplink grants available or configured uplink grants configured, PTP MBS MAC PDU transmission may be performed.

At step 1006, if the PDCCH indicates a UL transmission for PTP MBS:

- start the drx-HARQ-RTT-TimerUL for the corresponding HARQ process in the first symbol after the end of the first transmission (within a bundle) of the corresponding physical uplink shared channel (PUSCH) transmission; and
- stop the drx-RetransmissionTimerUL for the corresponding HARQ process.

At step 1008, if a MAC PDU for the PTP MBS is transmitted in a configured uplink grant and a listen-before-talk (LBT) failure indication is not received from lower layers:

- start the drx-HARQ-RTT-TimerUL for the corresponding HARQ process in the first symbol after the end of the first transmission (within a bundle) of the corresponding PUSCH transmission; and
- stop the drx-RetransmissionTimerUL for the corresponding HARQ process at the first transmission (within a bundle) of the corresponding PUSCH transmission.

At step 1010, if the PDCCH indicates a new transmission (DL or UL) for PTP MBS on a Serving Cell in this DRX group:

- start or restart drx-InactivityTimer for this DRX group in the first symbol after the end of the PDCCH reception.

At step 1012, if the PDCCH indicates a UL transmission for PTP MBS:

- start the drx-HARQ-RTT-TimerUL for the corresponding HARQ process in the first symbol after the end of the first transmission (within a bundle) of the corresponding PUSCH transmission; and stop the drx-RetransmissionTimerUL for the corresponding HARQ process.

The UE 10 may also be considered to be in unicast active time, when a SR is sent on PUCCH or MBS PUCCH, in response to UL data arrival on MBS PTP and scheduling request is pending. During the active time, the UE 10 may monitor for the C-RNTI/CS-RNTI and/or UE 10 specific RNTI assigned for the MBS PTP related PDCCH.

Only PUCCH or MBS PUCCH resources on a BWP which is active at the time of SR transmission occasion may be considered valid.

When the UE's 10 configuration is changed i.e., MBS PUCCH configuration may be added (or removed), the UE 10 may switch reporting MBS HARQ feedback and/or PTP Scheduling Request and/or MBS CSI from over unicast PUCCH to MBS PUCCH (or from over MBS PUCCH to unicast PUCCH).

According to the method 1100, as illustrated in FIGS. 11*a* and 11*b*, at step 1102, as long as at least one SR is pending pertaining to PTP MBS, the MAC entity 40 may for each pending SR:

at step 1104, if the MAC entity 40 has no valid PUCCH and/or MBS PUCCH resource configured for the pending SR:

then at step 1106, a Random Access procedure may be initiated on the special cell (SpCell) and the pending SR may be cancelled.

else, for the SR configuration corresponding to the pending SR:

at step 1108, the MAC entity 40 may have an SR transmission occasion on the valid PUCCH and/or MBS PUCCH resource for SR configured;

at step 1110, the sr-ProhibitTimerMBS may not be running at the time of the SR transmission occasion; and at step 1112, the PUCCH and/or MBS PUCCH resource for the SR transmission occasion may not overlap with a measurement gap:

at step 1114, if scheduling request counter (SR_COUNTER)<maximum number of scheduling requests (sr-TransMax):

then, at step 1116, the physical layer may be instructed to signal the SR on one valid PUCCH and/or MBS PUCCH resource for SR;

else:

at step 1118, the RRC may be notified to release PUCCH and/or MBS PUCCH for all Serving Cells;

Approach 12: MBS CSI Masking

The MBS CSI may be transmitted along with the unicast CSI over the unicast PUCCH or may be transmitted separately over the MBS PUCCH.

If the MBS CSI masking (csi-MaskMBS) is setup by upper layers:

in current symbol n, if drx-onDurationTimer of a DRX group would not be running considering grants/assignments scheduled on the Serving Cell(s) in this DRX group and DRX Command MAC CE/Long DRX Command MAC CE received until 4 milliseconds prior to symbol n when evaluating all DRX Active Time conditions; and not report CSI and/or MBS CSI on PUCCH or MBS PUCCH in this DRX group.

Further, according to the method 1200 as illustrated in FIG. 12, the UE 10 may consider at least one of the conditions for considering MBS CSI reporting as:

At step 1202, when there is active time for at least one of the MBS(s) and MBS CSI is configured:

report the MBS CSI on PUCCH or MBS PUCCH

At step 1204, when at least one of the MBS(s) is deactivated and/or suspended:

not report the MBS CSI on PUCCH or MBS PUCCH

At step 1206, when all of the MBS(s) are suspended and/or deactivated:

not report the MBS CSI on PUCCH or MBS PUCCH

At step 1208, when at least one of the MBS(s) is activated and/or resumed:

report the MBS CSI on PUCCH or MBS PUCCH

Approach 13: Prioritization Among MBS and Unicast

Prioritization is defined for MBS and unicast with regard to SR/Random Access Channel (RACH)/BSR/HARQ ACK/PUCCH/PUSCH operations. One approach to derive the priority can be to relate to or compare the multicast and unicast priority, as determined by the UE 10 and reported by the UE 10 in the MBS interest indication message. According to the method 1300 as illustrated in FIG. 13, at step 1302, when there is a conflict situation to incorporate both HARQ ACK pertaining to the MBS and the unicast over shared PUCCH resources, priority of the MBS with respect to unicast can be considered. At step 1304, if the unicast HARQ ACK or the unicast SR is of higher priority, then the HARQ ACK pertaining to MBS can be dropped. At step 1306, if the MBS HARQ ACK is of higher priority, then the HARQ ACK pertaining to the unicast or unicast SR can be dropped.

In one embodiment, logical channel priority for the PTP logical channel(s) may be set higher than other unicast logical channel(s) or same as that of high priority unicast logical channel(s) to support quick grant and transmission of the PTP MBS data, which may include RLC status report and/or PDCP status report etc. In another embodiment, when unicast is of higher priority than multicast, logical channel priority for the unicast logical channel(s) may be set higher than the priority for PTP channel(s).

Approach 14: MAC Reset

In an embodiment herein, as illustrated by method 1400 in FIG. 14, at step 1402, the UE may perform the unicast MAC reset. During MAC reset, the MBS reception may not be affected, and the UE 10 may continue the operations for MBS reception.

Accordingly, during unicast MAC reset, the MAC entity 40 may:

at step 1402, flush the soft buffers for all DL HARQ processes, except for HARQ processes associated to PTM and/or PTP MBS; and at step 1404, for each DL HARQ process, except for that which is associated to PTM and/or PTP MBS, consider the next received transmission for a TB as the very first transmission.

In another embodiment, MAC reset operation may be defined as unicast MAC reset and MBS MAC reset and may be applied case to case which can involve at least one of unicast MAC reset, MBS MAC reset and a combination of both the MAC reset operations. unicast MAC reset and/or MBS MAC reset can be applied in many scenarios including radio link failure, cell selection/reselection, handover, reconfiguration, BWP change, RRC state change, security key change, switching across PTM and PTP, failure of reconfiguration, failure of handover etc.

In another embodiment, when the TAT timer has expired, the UE may flush all the HARQ buffers for all the serving cells except for the HARQ processes associated with the MCCH and the MBS broadcast services (for example, the corresponding MBS traffic channel (MTCHs)).

Approach 15: Monitoring During Measurement Gap

According to the method 1500 as illustrated in FIG. 15, at step 1502, the measurement operation may be limited to the unicast BWP excluding the MBS CFR and may not affect group-common operations of PDCCH and PDSCH for MBS reception.

At step 1503, during a measurement gap, the MAC entity 40 may, on the Serving Cell(s) in the corresponding frequency range of the measurement gap configured by measGapConfig:

not perform the transmission of the HARQ feedback, the SR, and the CSI for unicast and MBS;

not report sounding reference signal (SRS); and not transmit on uplink shared channel (UL-SCH) for unicast and MBS except for Msg3 or the MsgA payload;

at step 1504, if the ra-Response Window or the ra-ContentionResolutionTimer or the msgB-Response-Window is running:

at step 1506, the PDCCH and the group-common PDCCH may be monitored for MBS.

else:

at step 1508, except for the group-common PDCCH, the PDCCH may not be monitored for MBS; and at step 1510, except for the group-common PDSCH for MBS, the downlink shared channel (DL-SCH) may not be received.

In an embodiment herein, when the inter-frequency measurement gap is pursued, the UE 10 may not monitor group common PDCCH and group common PDSCH for MBS.

The various actions in methods 100, 200, 210, 220, 300, 310, 400, 500, 600, 700, 800, 900, 1000, 1100, 1200, 1300, 1400, and 1500 may be performed in the order presented, in a different order or simultaneously. Further, in some embodiments, some actions listed in FIGS. 1-15 may be omitted.

FIG. 16 illustrates an embodiment of the system 1600 for efficient and reliable reception of NR MBS. The UE 10 may be configured to receive MBS by PTP, PTM or a combination of PTP and PTM delivery. The UE 10 may comprise a processor 12 and a memory 14. The memory 14 may store program code or a set of instructions, that when executed by the processor 12, result in the performance of the actions previously disclosed herein by the UE 10. The processor 12 may be, but is not limited to, a general purpose processor, a digital signal processor, an application specific integrated circuit (ASIC), and a field programmable gate array (FPGA). The memory 14 can be, but is not limited to, RAM memory, flash memory, ROM memory, EPROM memory, a hard disk, or any other form of computer-readable storage medium.

The UE 10 may be configured to receive relevant configuration and signaling by the SIB 30, the RRC reconfiguration message 32, and the MCCH 34. The UE 10 may communicate with the gNB 20 through the UE capability information message regarding the number of BWPs/CFRs/CORESETS that the UE can monitor. The gNB 20 may configure which ReTx is to be used, and may provide the UE with the various DRX configuration through the RRC configuration message 32.

The MAC entity 40 may start and stop a plurality of MBS DRX timers, such as, but not limited to, the drx-onDurationTimerMBS timer, the drx-InactivityTimerMBS timer, the drx-RetransmissionTimerMBS timer, and the drx-HARQ-RTT-TimerMBS timer. The MAC entity 40 may also be configured with or to expect the kind of ReTx to be used upon the PDCCH indicating a DL transmission for one or more RNTI, or when a MAC PDU is received in a configured DL assignment for the MBS. The MAC entity 40 may instruct the physical layer to generate or skip generating an acknowledgement of MBS data in the transport block. The MAC entity 40 may also operate a MAC reset for one or more DL HARQ processes that are not one of the following: a PTP MBS, a PTM MBS, or a combination of the PTP MBS and the PTM MBS. The MAC entity 40, when the TAT timer has expired, may flush all the HARQ buffers for all the serving cells except for the HARQ processes associated with the MCCH and MBS broadcast services (for example the corresponding MTCHs).

FIG. 17 is a block diagram of an internal configuration of a base station, according to an embodiment of the disclosure.

Referring to FIG. 17, the base station according to an embodiment may include a transceiver 1710, a memory 1720, and a processor 1730. The transceiver 1710, the memory 1720, and the processor 1730 of the base station may operate according to a communication method of the base station described above. However, the components of the base station are not limited thereto. For example, the base station may include more or fewer components than those described above. In addition, the processor 1730, the transceiver 1710, and the memory 1720 may be implemented as a single chip. Also, the processor 1730 may include at least one processor.

The transceiver 1710 collectively refers to a base station receiver and a base station transmitter, and may transmit/receive a signal to/from a terminal. The signal transmitted or received to or from the terminal may include control information and data. The transceiver 1710 may include a RF transmitter for up-converting and amplifying a frequency of a transmitted signal, and a RF receiver for amplifying low-noise and down-converting a frequency of a received signal. However, this is only an example of the transceiver 1710 and components of the transceiver 1710 are not limited to the RF transmitter and the RF receiver.

Also, the transceiver 1710 may receive and output, to the processor 1730, a signal through a wireless channel, and transmit a signal output from the processor 1730 through the wireless channel.

The memory 1720 may store a program and data required for operations of the base station. Also, the memory 1720 may store control information or data included in a signal obtained by the base station. The memory 1720 may be a storage medium, such as read-only memory (ROM), random access memory (RAM), a hard disk, a CD-ROM, and a DVD, or a combination of storage media.

The processor 1730 may control a series of processes such that the base station operates as described above. For example, the transceiver 1710 may receive a data signal including a control signal transmitted by the terminal, and the processor 1730 may determine a result of receiving the control signal and the data signal transmitted by the terminal.

FIG. 18 is a block diagram showing an internal structure of a terminal, according to an embodiment of the disclosure.

Referring to FIG. 18, the terminal of the disclosure may include a transceiver 1810, a memory 1820, and a processor 1830. The transceiver 1810, the memory 1820, and the processor 1830 of the terminal may operate according to a communication method of the terminal described above. However, the components of the terminal are not limited thereto. For example, the terminal may include more or fewer components than those described above. In addition, the processor 1830, the transceiver 1810, and the memory

1820 may be implemented as a single chip. Also, the processor 1830 may include at least one processor.

The transceiver 1810 collectively refers to a terminal receiver and a terminal transmitter, and may transmit/receive a signal to/from a base station. The signal transmitted or received to or from the base station may include control information and data. In this regard, the transceiver 1810 may include a RF transmitter for up-converting and amplifying a frequency of a transmitted signal, and a RF receiver for amplifying low-noise and down-converting a frequency of a received signal. However, this is only an example of the transceiver 1810 and components of the transceiver 1810 are not limited to the RF transmitter and the RF receiver.

Also, the transceiver 1810 may receive and output, to the processor 1830, a signal through a wireless channel, and transmit a signal output from the processor 1830 through the wireless channel.

The memory 1820 may store a program and data required for operations of the terminal. Also, the memory 1820 may store control information or data included in a signal obtained by the terminal. The memory 1820 may be a storage medium, such as ROM, RAM, a hard disk, a CD-ROM, and a DVD, or a combination of storage media.

The processor 1830 may control a series of processes such that the terminal operates as described above. For example, the transceiver 1810 may receive a data signal including a control signal, and the processor 1830 may determine a result of receiving the data signal.

According to an aspect of the present disclosure, a method for managing multicast broadcast service (MBS) discontinuous reception (DRX) having a point to multipoint (PTM) delivery to a user equipment (UE) is provided. The method, comprises: configuring a DRX configuration for the MBS that the UE (10) is receiving, the DRX configuration includes at least one of a drx-onDurationTimerMBS timer, a drx-InactivityTimerMBS timer, a drx-HARQ-RTT-TimerMBS timer, a drx-RetransmissionTimerMBS timer, and a MBS DRX cycle, the MBS DRX cycle is one of a MBS short DRX cycle or a MBS long DRX cycle; determining an active time for the MBS that the UE (10) is receiving, the active time includes the duration for which at least one of the drx-onDurationTimerMBS timer, the drx-InactivityTimerMBS timer, and the drx-RetransmissionTimerMBS timer is running; monitoring, during the determined active time for the MBS, a physical downlink control channel (PDCCH) addressed to a group-radio network temporary identifier (G-RNTI) or a group-configured scheduling-RNTI (G-CS-RNTI) for the MBS indicating a downlink (DL) transmission for the PTM delivery; and receiving, during the determined active time for the MBS, the PDCCH addressed to the G-RNTI or the G-CS-RNTI for the MBS.

In an embodiment, upon receiving the PDCCH addressed to the G-RNTI or the G-CS-RNTI for the MBS indicating a new downlink (DL) transmission for the PTM delivery, the drx-InactivityTimerMBS timer for the pertinent MBS is started or restarted in the first symbol after the end of the PDCCH reception.

In an embodiment, upon the expiry of the drx-InactivityTimerMBS timer for the PTM MBS, if the MBS short DRX cycle is configured, the UE (10) starts or restarts a ShortCycleTimerMBS timer for the pertinent MBS in the first symbol after the expiry of the drx-InactivityTimerMBS timer, and the UE (10) starts using the MBS Short DRX cycle for the pertinent MBS.

In an embodiment, upon the expiry of the drx-InactivityTimerMBS timer for the PTM MBS, if the MBS long DRX cycle is configured, the UE (10) starts using the MBS Long DRX cycle for the pertinent MBS.

In an embodiment, upon receiving, by the UE (10), one of a MBS DRX command medium access control (MAC) control element (CE) or a MBS Long DRX command MAC CE for the MBS multicast service, at least one of the following timers is stopped: the drx-on-DurationTimerMBS timer and the drx-InactivityTimerMBS timer for the pertinent MBS.

In an embodiment, upon receiving, by the UE (10), the MBS DRX command MAC CE for the MBS multicast service, if the MBS short DRX cycle is configured, the UE (10) starts or restarts a ShortCycleTimerMBS timer for the pertinent MBS in the first symbol after the end of DRX command MAC CE reception and the UE (10) starts using the MBS Short DRX cycle for the pertinent MBS, and if the MBS short DRX cycle is not configured, the UE (10) starts using the MBS Long DRX cycle for the pertinent MBS.

In an embodiment, upon receiving, by the UE (10), the MBS Long DRX command MAC CE for the MBS multicast service, if the MBS short DRX cycle is configured, the UE (10) stops a ShortCycleTimerMBS timer for the pertinent MBS in the first symbol after the end of the MBS Long DRX command MAC CE reception and the UE (10) starts using the MBS Long DRX cycle for the pertinent MBS, and if the MBS short DRX cycle is not configured, the UE (10) starts using the MBS Long DRX cycle for the pertinent MBS.

In an embodiment, at least one of the MBS DRX command MAC CE and the MBS Long DRX command MAC CE is identified by a specific logical channel identity, is mapped to the physical downlink shared channel (PDSCH) scheduled with one of the G-RNTI or the G-CS-RNTI, and the UE (10) is receiving the PTM delivery of the MBS multicast service.

In an embodiment, during the active time of the MBS, the UE (10) monitors at least one of the following: one or more dedicated unicast bandwidth parts (BWP); one or more MBS BWPs or one or more MBS common frequency resources (CFR); one or more MBS BWPs or MBS CFRs that are relevant to the one or more MBS multicast services that are not deactivated; an initial BWP; a default BWP; one or more configured MBS BWP for MBS broadcast services; one or more configured MBS CFR for MBS broadcast services; one or more MBS control resource set (CORESET); a CORESET with an index value of zero; one or more MBS control channel (MCCH)(34) bandwidths or one or more CFRs; and one or more configured MBS BWP or MBS CFR that are relevant to the MBS broadcast services that are active.

According to an aspect of the present disclosure, a method for managing multicast broadcast service (MBS) reception in a wireless communication network is provided. The method comprises: receiving an initial transmission and one of a point-to-point (PTP) retransmission, a point-to-multipoint (PTM) retransmission, or both the PTP retransmission and the PTM retransmission, without configuration or as per configuration, the configuration, if provided, is signaled in a radio resource control (RRC) reconfiguration message (32).

In an embodiment, the method comprises: receiving, by a user equipment (UE)(10), one of the following: a physical downlink control channel (PDCCH) indicating a downlink (DL) transmission addressed for a group-radio network temporary identifier (G-RNTI) or a group-configured scheduling-RNTI (G-CS-RNTI), or a cell-RNTI (C-RNTI) or a CS-RNTI, or a medium access control (MAC) protocol data unit (PDU) in a configured DL assignment for the MBS; and performing, by the UE (10), one of the following actions: starting, by the UE (10), a drx-HARQ-RTT-TimerDL timer, if only the PTP retransmission is expected or configured; starting, by the UE (10), a drx-HARQ-RTT-TimerMBS timer, if only the PTM retransmission is expected or configured; and starting, by the UE (10), the drx-HARQ-RTT-TimerDL timer and the drx-HARQ-RTT-TimerMBS timer, if both the PTP retransmission and the PTM retransmission are expected or configured.

In an embodiment, the method comprises: receiving, by a user equipment (UE) (10), one of the following: a physical downlink control channel (PDCCH) indicating a downlink (DL) transmission addressed to a group-radio network temporary identifier (G-RNTI) or a group-configured scheduling-RNTI (G-CS-RNTI), or a cell-RNTI (C-RNTI) or a CS-RNTI, or a medium access control (MAC) protocol data unit (PDU) in a configured DL assignment for the MBS; and performing, by a user equipment (UE) (10), one of the following actions; starting, by the UE (10), a drx-HARQ-RTT-TimerDL timer for a corresponding hybrid automatic repeat request (HARQ) process in the first symbol after the end of a corresponding transmission carrying a DL HARQ feedback, if only the PTP retransmission is expected or configured; starting, by the UE (10), a drx-HARQ-RTT-TimerMBS timer for the corresponding HARQ process in the first symbol after the end of the corresponding transmission carrying the DL HARQ feedback, if only the PTM retransmission is expected or configured; and starting, by the UE (10), the drx-HARQ-RTT-TimerDL timer for the corresponding HARQ process in the first symbol after the end of the corresponding transmission carrying the DL HARQ feedback and the drx-HARQ-RTT-TimerMBS timer for the corresponding HARQ process in the first symbol after the end of the corresponding transmission carrying the DL HARQ feedback, if both the PTP retransmission and the PTM retransmission are expected or configured.

In an embodiment, the method comprises: performing, by a medium access control (MAC) entity (40), one of the following: starting, by the MAC entity (40), a drx-RetransmissionTimerDL timer, upon expiry of the drx-HARQ-RTT-TimerDL timer and an unsuccessful decoding of the data of the corresponding HARQ process, in the first symbol after the expiry of the drx-HARQ-RTT-TimerDL timer; starting, by the MAC entity (40), a drx-RetransmissionTimerMBS timer, upon expiry of the drx-HARQ-RTT-TimerMBS timer and an unsuccessful decoding of the data of the corresponding HARQ process, in the first symbol after the expiry of the drx-HARQ-RTT-TimerMBS timer; and starting, by the MAC entity (40), the drx-RetransmissionTimerDL timer upon expiry of the drx-HARQ-RTT-TimerDL timer and an unsuccessful decoding of the data of the corresponding HARQ process, in the first symbol after the expiry of the drx-HARQ-RTT-TimerDL timer, and starting the drx-RetransmissionTimerMBS timer upon expiry of the drx-HARQ-RTT-TimerMBS timer and an unsuccessful decoding of the data of the corresponding HARQ process, in the first symbol after the expiry of the drx-HARQ-RTT-TimerMBS timer.

According to an aspect of the present disclosure, a method for switching a hybrid automatic repeat request (HARQ) feedback or retransmission mode is provided. The method comprises: configuring, by a radio base station (gNB)(20), a new HARQ feedback or retransmission mode for a multicast broadcast service (MBS) bearer; and indicating, by the gNB (20), the new HARQ feedback or retransmission mode in one of the following: the configuration information of a MBS multicast bearer in a radio resource control (RRC) reconfiguration message (32) for a user equipment (UE) (10) in the connected state; and a broadcasted signaling for a MBS broadcast bearer configuration for the UE (10), where in the broadcasted signaling includes at least one of a system information block (SIB) (30) and a MBS control channel (MCCH) (34).

In an embodiment, the new HARQ feedback or retransmission mode for a multicast broadcast service (MBS) bearer for the UE (10) in the connected state includes at least one of the following: acknowledgment (ACK)-negative acknowledgement (NACK)-based HARQ feedback or retransmission mode; NACK only based HARQ feedback or retransmission mode; feedback-less HARQ retransmission mode, there is no feedback provided but retransmission can occur for the HARQ process; and no HARQ retransmission mode, there is no retransmission for the HARQ process.

In an embodiment, the new HARQ retransmission mode for the UE (10) in the idle or the inactive state includes at least one of the following: feedback-less HARQ retransmission mode; and no HARQ retransmission mode.

In an embodiment, the method comprises: performing at least one of the following: indicating in an explicit manner the use of point-to-point (PTP) delivery for a HARQ retransmission of point-to-multipoint (PTM) MBS packets; configuring one of the following types of retransmission: PTP, PTM, and a combination of PTP and PTM, the configuration of the retransmission is changed when there is an explicit switching of the retransmission mode; and providing the UE (10) with at least one of the following types of retransmission: PTP, PTM, and the combination of PTP and PTM, when an implicit switching of the retransmission mode takes place.

In an embodiment, the UE (10) receives the configuration and the settings for the HARQ feedback or retransmission mode in one of the following: the RRC reconfiguration message (32) for PTM multicast services when the UE (10) is in the connected state; the SIB (30) or the MCCH (34); and the RRC reconfiguration message (32) for PTP reception.

In an embodiment, the configuration and settings for the HARQ feedback or retransmission mode are provided and applied per MBS service.

In an embodiment, an enabling or a disabling of the HARQ feedback is based on at least one of the following: an RRC signaled enabling or disabling for the MBS; and a downlink control information (DCI) based enabling or disabling for the HARQ feedback for the MBS addressed by a group-radio network temporary identifier (G-RNTI) or a group-configured scheduling-RNTI (G-CS-RNTI).

In an embodiment, the method comprises: indicating by a medium access control (MAC) layer to a physical layer to generate or skip generating an acknowledgement of the MBS data received in a transport block.

In an embodiment, a MAC entity (40) instructs the physical layer to skip generating the acknowledgement of the MBS data in the transport block upon occurrence of one or more events, or the MAC entity (40) instructs the physical layer to generate the acknowledgement of the MBS data in the transport block upon non-occurrence of the one more events, and the one or more events include the following: an HARQ process associated with a transmission indicated with a temporary cell radio network temporary identifier (temporary C-RNTI) and a contention resolution is not successful; an HARQ process associated with a transmission indicated with a MessageB-RNTI and a random access procedure is not completed; an HARQ process being equal to a broadcast process; an HARQ process that is configured by the RRC or associated for one of the following: the feedback-less HARQ retransmission mode; the no HARQ retransmission mode; the MBS broadcast service; negative acknowledgement (NACK) only HARQ feedback, and MBS MAC protocol data unit (PDU) is successfully decoded; a MBS physical uplink control channel (PUCCH) having lesser priority than a unicast PUCCH, the MBS PUCCH conflicts with the unicast PUCCH, and the HARQ process is relevant to the NR MBS; and stopping or expiry of a timeAlignmentTimer (TAT) timer that is associated with a timing advance group (TAG) having the serving cell on which the HARQ feedback is to be transmitted.

In an embodiment, the MBS HARQ feedback is mapped to either the unicast PUCCH or the MBS PUCCH, and an RRC configuration determines if either the unicast PUCCH or the MBS PUCCH is used.

In an embodiment, the UE (10) determines the PUCCH to be used for the MBS HARQ feedback based on at least one of the following: always the unicast PUCCH; always the MBS PUCCH; the MBS PUCCH if it is configured; the MBS PUCCH if ACK-NACK based HARQ feedback is configured; the unicast PUCCH if NACK only based HARQ feedback is configured; priority of the multicast with respect to the unicast, if the multicast has higher priority than the unicast, then the MBS PUCCH is used, and if the unicast has higher priority than the multicast, then the unicast PUCCH is used; priority of the MBS PUCCH and the unicast PUCCH, the MBS HARQ feedback is mapped to the MBS PUCCH if it has higher priority over the unicast PUCCH, the MBS HARQ feedback is mapped to the unicast PUCCH if it has higher priority over the MBS PUCCH; the MBS HARQ feedback is not transmitted if the MBS PUCCH has a priority lesser than the unicast PUCCH; the unicast PUCCH, if the MBS PUCCH conflicts with the unicast PUCCH timing; the MBS HARQ feedback is not transmitted if the MBS PUCCH conflicts with the unicast PUCCH timing; priority of a scheduling request (SR) and the MBS HARQ feedback, the MBS HARQ feedback is not transmitted if the priority of the SR is higher than the priority for MBS HARQ feedback; the MBS HARQ feedback is transmitted on unicast PUCCH if the priority of the MBS HARQ feedback is higher than the priority of the SR; and multiplex at least one of the MBS HARQ feedback and the PTP SR, along with at least one of the unicast HARQ feedback and the SR if the priority of the MBS HARQ feedback is equal to or higher than the priority of the unicast HARQ feedback or the SR.

In an embodiment, the UE (10) switches reporting the MBS HARQ feedback, from over the unicast PUCCH to the MBS PUCCH, or vice versa, upon at least one of the following changes: a MBS PUCCH configuration is added; and the MBS PUCCH configuration is removed.

According to an aspect of the present disclosure, a method for monitoring a group-radio network temporary identifier (G-RNTI) or a group-configured scheduling-RNTI (G-CS-RNTI), and a cell-RNTI (C-RNTI) or a CS-RNTI, by a user equipment (UE) (10), in an explicit switching mode is provided. The method comprises performing at least one of the following: monitoring the G-RNTI or the G-CS-RNTI for a physical downlink control channel (PDCCH) and for a physical downlink shared channel (PDSCH) over a point-to-multipoint (PTM) reception path when a PTM mode is enabled or configured for a specific MBS bearer; monitoring the C-RNTI or the CS-RNTI for the PDCCH and the G-RNTI or the G-CS-RNTI for the PDSCH when the PTM mode is enabled or configured for the specific MBS bearer; monitoring the C-RNTI or the CS-RNTI for the PDCCH and for the PDSCH over a point-to-point (PTP) reception path when a PTP mode is enabled or configured for the specific MBS bearer; monitoring the G-RNTI or the G-CS-RNTI for the PDCCH and for the PDSCH over the PTM reception path and the C-RNTI or the CS-RNTI for the PDCCH and for the PDSCH over the PTP reception path when the PTM mode and the PTP mode are enabled or configured for the specific MBS bearer; monitoring the G-RNTI or the G-CS-RNTI over the PTM reception path and the C-RNTI or the CS-RNTI over the PTP reception path when the PTM mode and the PTP mode are switched between each other, for a temporary duration the UE monitors the G-RNTI or the G-CS-RNTI and the C-RNTI or the CS-RNTI, and the temporary duration is specified, configured, or indicated when the switching between the PTM mode and the PTP mode occurs; and monitoring the G-RNTI or the G-CS-RNTI over the PTM reception path and the C-RNTI or the CS-RNTI over the PTP reception path irrespective of the MBS bearer mode.

According to an aspect of the present disclosure, a method for monitoring a group-radio network temporary identifier (G-RNTI) or a group-configured scheduling-RNTI (G-CS-RNTI), and a cell-RNTI or a CS-RNTI, by a user equipment (UE) (10), in an implicit switching mode is provided. The method comprises: monitoring the G-RNTI or the G-CS-RNTI over a point-to-multipoint (PTM) reception path and the C-RNTI or the CS-RNTI over a point-to-point (PTP) reception path.

According to an aspect of the present disclosure, a method for discontinuous reception (DRX) scheduling or configuration for multicast broadcast service (MBS) is provided. The method comprises: configuring a MBS bearer to have a DRX configuration identical to a unicast DRX configuration if the MBS bearer includes a point-to-point (PTP) reception path; and configuring the MBS bearer to have a DRX configuration different from the unicast DRX configuration if the MBS bearer includes a point-to-multipoint (PTM) reception path.

According to an aspect of the present disclosure, a method for responding to uplink (UL) data arrival from higher layer on a multicast broadcast service (MBS) point-to-point (PTP) bearer, the method comprises: sending a scheduling request on a physical uplink control channel (PUCCH) or a MBS PUCCH, a user equipment (UE) (10) is in unicast active time when the scheduling request is pending; and monitoring, by the UE (10), during the unicast active time for a cell radio network temporary identifier (C-RNTI) or CS-RNTI, for a physical downlink control channel (PDCCH) related to the MBS PTP.

According to an aspect of the present disclosure, a method for deriving prioritization among multicast broadcast service (MBS) and unicast, when there is a conflict situation to incorporate MBS information and unicast information together is provided. The method comprises: dropping a MBS hybrid automatic repeat request (HARQ) feedback if a unicast HARQ feedback is higher in priority than the MBS HARQ feedback, or vice versa, a user equipment (UE) (10) determines the priority of the unicast HARQ feedback and the MBS HARQ feedback; and dropping the MBS HARQ feedback if a unicast scheduling request (SR) is higher in priority than the MBS HARQ feedback, or vice versa.

In an embodiment, a logical channel priority for one or more point-to-point (PTP) logical channels is either set higher than one or more unicast logical channels or is set identical to that one or more high priority unicast logical channels, the one or more PTP logical channels support a quick grant and transmission of PTP MBS data that includes at least one of the following: a radio link control (RLC) status report, and a packet data convergence protocol (PDCP) status report.

According to an aspect of the present disclosure, a method for operating a medium access control (MAC) reset, by a MAC entity (40), for a plurality of downlink (DL) hybrid automatic repeat request (HARQ) processes is provided. The method comprises: flushing one or more soft buffers for all the DL HARQ processes; and considering, for each DL HARQ process, a subsequent received transmission for a transport block (TB) as the very first transmission, the plurality of DL HARQ processes are not associated to at least one of the following: a point-to-point (PTP) multicast broadcast service (MBS), a point-to-multipoint (PTM) MBS, and a combination of the PTP MBS and the PTM MBS.

In an embodiment, the MAC reset applies to at least one of the following scenarios: a radio link failure; a cell selection or reselection; a handover; a reconfiguration; a security key change; a switching between point-to-multi-point (PTM) and point-to-point (PTP); a bandwidth parts (BWP) change; a radio resource control state change; a failure of reconfiguration; and a failure of handover.

In an embodiment, the MAC reset includes a unicast MAC reset, a MBS MAC reset, or a combination of the unicast MAC reset and the MBS MAC reset.

According to an aspect of the present disclosure, a system is provided. The system comprises: a user equipment (UE) (10), the UE (10) is configured to perform at least one of the following: receive one or more multicast broadcast services (MBS) in a point-to-point (PTP) delivery, a point-to-multi-point (PTM) delivery, or a combination of the PTP delivery and the PTM delivery; monitor at least one of the following: one or more dedicated unicast bandwidth parts (BWP), one or more MBS BWPs, one or more MBS common frequency resources (CFR), one or more MBS BWPs or MBS CFRs that are relevant to the one or more MBS that are active; switch between a connected state or an idle state or an inactive state, the UE (10) is in one or more retransmission modes depending on its state, the one or more retransmission modes includes at least one type of hybrid automatic repeat request (HARQ) feedback or retransmission mode; receive the configuration and the settings for a HARQ feedback or retransmission mode in one of the following: a radio resource control (RRC) RRC reconfiguration message (32) for PTM multicast services when the UE is in the connected state; a system information block (30) or a multicast broadcast service control channel (MCCH) (34); and a RRC reconfiguration message (32) for PTP reception; determine the physical uplink control channel (PUCCH) to be used for a MBS HARQ feedback; and monitor for a group-radio network temporary identifier (G-RNTI) or G-CS-RNTI and a cell-RNTI (C-RNTI) or a CS-RNTI in one or more switching modes; configure a DRX configuration for the MBS that the UE (10) is receiving, the DRX configuration includes at least one of a drx-onDurationTimerMBS timer, a drx-InactivityTimerMBS timer, a drx-HARQ-RTT-TimerMBS timer, a drx-RetransmissionTimerMBS timer, and a MBS DRX cycle, and the MBS DRX cycle is one of a MBS short DRX cycle or a MBS long DRX cycle; and determine an active time for the MBS that the UE (10) is receiving, the active time includes the duration for which at least one of the drx-onDurationTimerMBS timer, the drx-InactivityTimerMBS timer, and the drx-RetransmissionTimerMBS timer is running; and monitor, during the determined active time for the MBS, a physical downlink control channel (PDCCH) addressed to the G-RNTI or the G-CS-RNTI for the MBS indicating a downlink (DL) transmission for the PTM delivery; a medium access control (MAC) entity (40), the MAC entity (40) is configured to perform at least one of the following: configure or expect the kind of retransmission to be used upon a physical downlink control channel (PDCCH) indicating a downlink (DL) transmission for one or more RNTI, or when a MAC protocol data unit (PDU) is received in a configured DL assignment for the one or more MBS; instruct or not instruct a physical layer to generate an acknowledgement of data in a transport block; and operate a MAC reset for one or more DL HARQ processes that are not associated to one of the following: a PTP MBS, a PTM MBS, or a combination of the PTP MBS and the PTM MBS.

The embodiments disclosed herein can be implemented through at least one software program running on at least one hardware device (an example of this is the UE 10) and performing network management functions to control the elements. The elements can be at least one of a hardware device, or a combination of hardware device and software module. The hardware device may have a processor to execute the software program to perform one, some and/or all of the above-described actions and steps.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the present disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the present disclosure. Another storage device on the communication network may also be connected to the apparatus performing the embodiments of the present disclosure.

In the afore-described embodiments of the present disclosure, elements included in the present disclosure are expressed in a singular or plural form according to the embodiments. However, the singular or plural form is appropriately selected for convenience of explanation and the present disclosure is not limited thereto. As such, an element expressed in a plural form may also be configured as a single element, and an element expressed in a singular form may also be configured as plural elements.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

The invention claimed is:

1. A method performed by a user equipment (UE) in a wireless communication system, the method comprising:

receiving, from a base station, a radio resource control (RRC) message including a discontinuous reception (DRX) configuration for a multicast broadcast service (MBS) corresponding to a group-radio network temporary identifier (G-RNTI) or a group-configured scheduling-RNTI (G-CS-RNTI) and a hybrid automatic repeat request (HARQ) feedback configuration for the MBS;

monitoring, during an active time for the MBS, a physical downlink control channel (PDCCH) addressed to the G-RNTI or the G-CS-RNTI for the MBS based on the DRX configuration; and receiving, from the base station, the PDCCH addressed to the G-RNTI or the G-CS-RNTI for the MBS, wherein the DRX configuration for the MBS comprises a drx-onDurationTimerpoint-to-multipoint (PTM) for the MBS, a drx-Inactivity TimerPTM for the MBS, a drx-HARQ-RTT-TimerDLPTM for the MBS, a drx-RetransmissionTimerDLPTM for the MBS, a DRX cycle for the MBS, and a DRX start offset for the MBS, wherein, if a medium access control (MAC) protocol data unit (PDU) is received in a configured downlink (DL) assignment for the MBS, the drx-HARQ-RTT-TimerDLPTM for the MBS is started for a corresponding HARQ process in a first symbol after an end of a transmission carrying a DL HARQ feedback, wherein the HARQ feedback configuration configures the DL HARQ feedback as a negative acknowledgement (NACK)-only mode for the MBS, wherein the DRX cycle for the MBS is a PTM long DRX cycle for the MBS, wherein the active time comprises a duration in which at least one of the drx-onDurationTimerPTM for the MBS, the drx-Inactivity TimerPTM for the MBS or the drx-RetransmissionTimerDLPTM for the MBS is running, wherein the DL HARQ feedback is mapped to either a unicast physical uplink control channel (PUCCH) or an MBS PUCCH, and wherein the RRC message configures whether the unicast PUCCH or the MBS PUCCH is used.

2. The method of claim 1, further comprising:

starting or restarting the drx-InactivityTimerPTM for the MBS in a first symbol after an end of the PDCCH, if the PDCCH indicates a new transmission for the MBS.

3. The method of claim 1, further comprising:

starting the PTM long DRX cycle for the MBS based on the DRX cycle for the MBS and the DRX start offset for the MBS.

4. The method of claim 1, wherein enabling or disabling of the DL HARQ feedback is based on at least one of the following:

an RRC signaling enabling or disabling the MBS; or a downlink control information (DCI) enabling or disabling the MBS addressed by the G-RNTI or the G-CS-RNTI.

5. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, a radio resource control (RRC) message including a discontinuous reception (DRX) configuration for a multicast broadcast service (MBS) corresponding to a group-radio network temporary identifier (G-RNTI) or a group-configured scheduling-RNTI (G-CS-RNTI) and a hybrid automatic repeat request (HARQ) feedback configuration for the MBS, monitor, during an active time for the MBS, a physical downlink control channel (PDCCH) addressed to the G-RNTI or the G-CS-RNTI for the MBS based on the DRX configuration, and receive, from the base station, the PDCCH addressed to the G-RNTI or the G-CS-RNTI for the MBS, wherein the DRX configuration for the MBS comprises a drx-onDurationTimerpoint-to-multipoint (PTM) for the MBS, a drx-Inactivity TimerPTM for the MBS, a drx-HARQ-RTT-TimerDLPTM for the MBS, a drx-RetransmissionTimerDLPTM for the MBS, a DRX cycle for the MBS, and a DRX start offset for the MBS, wherein, if a medium access control (MAC) protocol data unit (PDU) is received in a configured downlink (DL) assignment for the MBS, the drx-HARQ-RTT-TimerDLPTM for the MBS is started for a corresponding HARQ process in a first symbol after an end of a transmission carrying a DL HARQ feedback, wherein the HARQ feedback configuration configures the DL HARQ feedback as a negative acknowledgement (NACK)-only mode for the MBS, wherein the DRX cycle for the MBS is a PTM long DRX cycle for the MBS, wherein the active time comprises a duration in which at least one of the drx-onDurationTimerPTM for the MBS, the drx-Inactivity TimerPTM for the MBS, or the drx-RetransmissionTimerDLPTM for the MBS is running, wherein the DL HARQ feedback is mapped to either a unicast physical uplink control channel (PUCCH) or an MBS PUCCH, and wherein the RRC message configures whether the unicast PUCCH or the MBS PUCCH is used.

6. The UE of claim 5, wherein the instructions further cause the UE to:

start or restart the drx-InactivityTimerPTM for the MBS in a first symbol after an end of the PDCCH, if the PDCCH indicates a new downlink transmission for the MBS.

7. The UE of claim 5, wherein the instructions further cause the UE to:

start the PTM long DRX cycle for the MBS based on the DRX cycle for the MBS and the DRX start offset for the MBS.

8. The UE of claim 5, wherein an enabling or disabling of the DL HARQ feedback is based on at least one of the following:

an RRC signaling enabling or disabling the MBS; or downlink control information (DCI) enabling or disabling the MBS addressed by the G-RNTI) or the G-CS-RNTI.

* * * * *